(12) United States Patent
Waliullah et al.

(10) Patent No.: US 12,401,313 B1
(45) Date of Patent: *Aug. 26, 2025

(54) PONTOON PLATFORM SUPPORTED SOLAR VOLTAIC SYSTEM

(71) Applicant: KING FAHD UNIVERSITY OF PETROLEUM AND MINERALS, Dhahran (SA)

(72) Inventors: Shafiqur Rehman Hafez Waliullah, Dhahran (SA); Kashif Irshad, Dhahran (SA); Mohamed A. Mohandes, Dhahran (SA); Ali Ahmad Al-Shaikhi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/185,001

(22) Filed: Apr. 21, 2025

Related U.S. Application Data

(63) Continuation of application No. 19/028,138, filed on Jan. 17, 2025, now Pat. No. 12,323,091.

(30) Foreign Application Priority Data

Jan. 14, 2025 (SA) .............................. 1020250260

(51) Int. Cl.
*H02S 20/30* (2014.01)
*B63B 35/44* (2006.01)
(Continued)

(52) U.S. Cl.
CPC .............. *H02S 20/30* (2014.12); *B63B 35/44* (2013.01); *H02J 3/38* (2013.01); *H02J 7/35* (2013.01);
(Continued)

(58) Field of Classification Search
None
See application file for complete search history.

(56) References Cited

U.S. PATENT DOCUMENTS 9,729,101 B1 8/2017 Schmaelzle et al.
11,319,035 B2 5/2022 Chen
(Continued)

FOREIGN PATENT DOCUMENTS

IL 279932 A 3/2021
WO 2024/078733 A1 4/2024

OTHER PUBLICATIONS

"Floating Solar Photovoltaic", Tropical Renewable Energy Center, Oct. 7, 2017, 3 pages.
(Continued)

*Primary Examiner* — Daniel P Malley, Jr.
(74) *Attorney, Agent, or Firm* — Oblon, McClelland, Maier & Neustadt, L.L.P.

(57) ABSTRACT

A floating solar photovoltaic system and a method for cooling a back surface of a photovoltaic panel are described. The floating solar photovoltaic system includes a rectangular float having a divided top platform and four interconnected walls, and a cross-shaped support configured to fit between the walls and holding four pontoons within openings formed thereby. An anchoring system maintains positional stability using concrete blocks interconnected by plastic-coated stainless-steel wires. A bi-facial solar photovoltaic panel is supported by the cross-shaped support, upon triangular braces, to generate electrical power from solar radiation. A waterproof control panel cabinet is also supported with the cross-shaped support. The floating solar photovoltaic system implements environmental monitoring through temperature and irradiance sensors, with data collection and wireless transmission capabilities. An integrated power management (Continued)

system enables both energy storage and transmission through a maximum power point tracking converter.

17 Claims, 13 Drawing Sheets

(51) Int. Cl.
    *H02J 3/38*      (2006.01)
    *H02J 7/35*      (2006.01)
    *H02S 40/32*      (2014.01)
    *H02S 40/34*      (2014.01)
    *H02S 40/38*      (2014.01)
    *H02S 40/42*      (2014.01)
    *H02S 50/00*      (2014.01)

(52) U.S. Cl.
    CPC .............. *H02S 40/32* (2014.12); *H02S 40/34* (2014.12); *H02S 40/38* (2014.12); *H02S 40/425* (2014.12); *H02S 50/00* (2013.01); *B63B 2035/4453* (2013.01); *H02J 2300/26* (2020.01)

(56) References Cited

U.S. PATENT DOCUMENTS

2009/0133732 A1*    5/2009    Hsia ........................ H02S 20/00
                                                                          136/206
2021/0214056 A1    7/2021    Harrison et al.

OTHER PUBLICATIONS

Pilx, "Floating Dock With Barrels (UPDATED)", Instructables, Oct. 20, 2020, 10 pages.
Adjustable Solar Panel Mount Mounting Rack Bracket—Windy Nation, Inc., 5 pages.

* cited by examiner

PONTOON PLATFORM SUPPORTED SOLAR VOLTAIC SYSTEM

CROSS-REFERENCE TO RELATED APPLICATIONS

The present application is a Continuation of U.S. application Ser. No. 19/028,138, now allowed, having a filing date of Jan. 17, 2025.

CROSS-REFERENCE TO RELATED APPLICATION

The present disclosure claims the benefit of Saudi Patent Application No. 1020250260, filed on Jan. 14, 2025, with the Saudi Authority for Intellectual Property Office, which is incorporated herein by reference in its entirety.

STATEMENT OF ACKNOWLEDGEMENT

Support provided by the King Fahd University of Petroleum and Minerals (KFUPM), Dhahran, Saudi Arabia through Project No. RETI CREP2522 is gratefully acknowledged.

BACKGROUND

Technical Field

The present disclosure is directed to renewable energy systems, and more particularly to floating photovoltaic (FPV) systems designed for deployment in marine and aquatic environments. Specifically, the present disclosure relates to an eco-adaptive floating platform incorporating sustainable materials, adaptive anchoring mechanisms, and integrated monitoring systems for high-level photovoltaic performance in marine conditions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The depletion of fossil fuel resources, driven by escalating global energy demand, has contributed to increased greenhouse gas emissions and has an adverse impact on climate change. This situation has necessitated a widespread implementation of renewable energy source (RES) technologies. Traditional ground-based photovoltaic systems (GPVS) face significant limitations related to land availability and operational efficiency. In response to these challenges, floating photovoltaic systems (FPVS) have emerged as an innovative technological solution. These systems demonstrate enhanced efficiency retention under harsh climatic conditions while simultaneously reducing water evaporation from reservoir surfaces. The reduced operating temperature of photovoltaic panels in FPVS installations minimizes hot spot formation, contributing to extended operational lifespan. Furthermore, these systems exhibit reduced dust accumulation compared to ground-based installations and facilitate efficient panel cleaning using reservoir water resources.

Early development of floating photovoltaic technology is exemplified by the research installation in Aichi, Japan, with a capacity of 20 kW [See: Trapani, Kim, and Miguel Redón Santafé. *"A review of floating photovoltaic installations: 2007-2013."* Progress in Photovoltaics: Research and Applications 23, no. 4 (2015): 524-532]. Subsequent research has indicated that FPVS coverage of merely 1% of natural basin surfaces could potentially satisfy approximately 25% of global electrical energy requirements. The technology has demonstrated rapid adoption across multiple jurisdictions, including Singapore, USA, France, Italy, Spain, and South Korea [See: Ranjbaran, Parisa, Hossein Yousefi, G. B. Gharehpetian, and Fatemeh Razi Astaraei. *"A review on floating photovoltaic (FPV) power generation units."* Renewable and Sustainable Energy Reviews 110 (2019): 332-347]. Notable implementations include Chinese installations with 40 MW capacity [See: Kenning, T. *"World's Largest Floating Solar Plant Comes Partially Online in China."* (2017)].

Research has demonstrated the dual benefits of land conservation and enhanced panel cooling in FPVS installations [See: Ueda, Yuzuru, Tsurugi Sakurai, Shinya Tatebe, Akihiro Itoh, and Kosuke Kurokawa. *"Performance analysis of PV systems on the water."* In Proceedings of the 23rd European photovoltaic solar energy conference, Valencia, Spain, pp. 2670-2673. 2008]. Implementation studies in Rajasthan, India, have demonstrated generation capacities ranging from 3 MW to 27 MW across four lake installations [See: Mittal, Divya, Bharat Kumar Saxena, and K. V. S. Rao. *"Potential of floating photovoltaic system for energy generation and reduction of water evaporation at four different lakes in Rajasthan."* In 2017 International Conference On Smart Technologies For Smart Nation (SmartTechCon), pp. 238-243. IEEE, 2017]. Further, a feasibility analysis of 1 MW FPVS installations at Kishore Sagar and Kota barrage sites demonstrated annual generation capabilities of 858,959 kWh and 1,838,519 kWh respectively [See: Mittal, Divya, Bharat Kumar Saxena, and K. V. S. Rao. *"Floating solar photovoltaic systems: An overview and their feasibility at Kota in Rajasthan."* In 2017 international conference on circuit, power and computing technologies (ICCPCT), pp. 1-7. IEEE, 2017]. The study additionally reported potential water evaporation reduction of 37 million liters annually per megawatt of installed FPVS capacity.

Comparative analysis between FPVS and ground-based GPVS installations demonstrates consistent performance advantages, with FPVS configurations achieving power gains exceeding 10% and efficiency improvements of approximately 3%. Table 1 (below) shows the comparative analysis of FPVS and ground based GPVS in terms of power gain and efficiency retention, sourced from references including Nisar et al. [See: Nisar, Hamza, Abdul Kashif Janjua, Hamza Hafeez, Nadia Shahzad, and Adeel Waqas. *"Thermal and electrical performance of solar floating PV system compared to on-ground PV system-an experimental investigation."* Solar Energy 241 (2022): 231-247]; Liu et al. [See: Liu, Haohui, Vijay Krishna, Jason Lun Leung, Thomas Reindl, and Lu Zhao. *"Field experience and performance analysis of floating PV technologies in the tropics."* Progress in Photovoltaics: Research and Applications 26, no. 12 (2018): 957-967]; Yadav et al. [See: Yadav, Neha, Manju Gupta, and K. Sudhakar. *"Energy assessment of floating photovoltaic system."* In 2016 International Conference on Electrical Power and Energy Systems (ICEPES), pp. 264-269. IEEE, 2016]; and do Sacramento et al. [See: Sacramento, Elissandro Monteiro do, Paulo C M Carvalho, José Carlos de Araújo, Douglas Bressan Riffel, Ronne Michel da Cruz Corrêa, and José Sigefredo Pinheiro Note. *"Scenarios for use of floating photovoltaic plants in Brazil-* ian reservoirs." *IET Renewable Power Generation* 9, no. 8 (2015): 1019-1024]. The analysis shows that a power gain of greater than 10% was achieved while improving efficiency by about 2%, as given in Table 1.

TABLE 1

Efficiency and Power Gain comparison between FPVS and GPVS

| Reference | Power Gain | Efficiency Gain | Type of floats |
|---|---|---|---|
| Nisar et al. | 10-17% | 1-4% (tilt angle) | Modular rafts, Membranes, Floats, Catamarans, Boats, Buoys, Pontoons |
| Liu et al. | 10-16% | 1.58-2.00% | |
| Yaday et al. | Not present | 0.79% | |
| do Sacramento et al. | 9.52-14.5% | Not present | |

Current floating platform technologies encompass multiple design approaches, including pontoons, spar-buoy, semi-submersible, and catamaran configurations. Among these, spar-buoy and catamaran designs demonstrate particular suitability for deep water and open ocean conditions, while maintaining operational capability in both calm and moderately rough water conditions, as shown in Table 2 (below).

TABLE 2

Types of floating platforms used in solar PV installations in water

| Type | Description | Advantages | Disadvantages | Suitable Water Depths |
|---|---|---|---|---|
| Pontoons | Flat, stable platforms that rely on pontoons for buoyancy. Best suited for calm, sheltered areas. | Low cost, simplicity in construction and deployment, good stability in calm water conditions. | Not suitable for open ocean or areas with high wave activity, limited scalability in rough waters. | Calm, sheltered waters like lakes and nearshore areas |
| Spar-buoy | Long, narrow, cylindrical platform with a submerged ballast, designed for deep water and stable in rough sea conditions. | High stability in rough waters, minimal vertical motion, suitable for deep water installations. | Complex and costly construction, requires specialized vessels for deployment. | Deep water, open ocean conditions |
| Semi-submersible | Partially submerged platforms stabilized by pontoons and a weighted understructure, suitable for a variety of water depths. | Good stability in varying sea conditions, adaptable to different water depths. | More complex design than pontoons, may require more maintenance. | A variety of water depths, including offshore conditions |
| Catamaran | Features two parallel hulls connected by a deck, offering stability and a large surface area for solar panels. | Stable and offers a large area for solar panels, suitable for calm to moderately rough water conditions. | Less common, specific designs may vary in efficiency and cost. | Calm to moderately rough water conditions |

There are different approaches to floating platform design, anchoring systems, and methods for integrating photovoltaic panels onto these platforms. These approaches provide various methods for constructing floating platforms, securing with anchoring systems, integrating photovoltaic panels onto these structures and the like.

IL279932B describes a floating solar panel array installation incorporating four barrels for flotation and concrete block anchoring. The platform utilizes a grid configuration with beams and crossbeams to support the barrels and solar panel mounting structures. The system employs a metal grid construction for structural support. This reference does not describe monitoring and data logging capabilities.

US20210214056A1 describes floating solar photovoltaic platforms utilizing high-density polyethylene resin encapsulating expanded polystyrene foam floats with integrated lift bars and module frames. The system incorporates photovoltaic module support structures within the floating platform design. This reference does not describe a comprehensive monitoring system with temperature sensors and data logging capabilities.

WO2024078733A1 describes a floating PV platform with a supporting metal structure incorporating pontoon bodies and automatically adjustable PV modules. The system provides integrated support and adjustment mechanisms for photovoltaic installations. This reference does not describe a comprehensive monitoring system with temperature sensors and data logging capabilities.

Each of the aforementioned references suffers from one or more drawbacks hindering their adoption, such as limited adaptability to varying marine conditions, insufficient integration of sustainable materials, inadequate monitoring and control systems, complex maintenance requirements, and environmental impact concerns. Accordingly, it is one object of the present disclosure to provide systems and methods which provide energy generation through utilization of marine environmental factors, including water-surface cooling effects and reflected radiation capture, with data collection capability for performance monitoring and predictive maintenance purposes.

SUMMARY

In an exemplary embodiment, a floating solar photovoltaic system is described, comprising: a rectangular float having a divided top platform and a first wall, a second wall opposite the first wall, a third wall connected to a first end of the first wall and to a first end of the second wall, and a fourth wall opposite the third wall; a cross-shaped support configured to fit between the four walls of the rectangular float; a set of four pontoons, wherein the cross-shaped support is configured to hold each one of the four pontoons within openings formed by the cross-shape of the cross-shaped support; a bi-facial solar photovoltaic panel configured to generate electrical power from solar radiation; a control panel cabinet connected to the cross-shaped support; a first triangular brace connected to a first side of the divided top platform; and a second triangular brace connected to a second side of the divided top platform, wherein each triangular brace is equipped with mounting hardware configured to secure the bi-facial solar photovoltaic panel upon the respective triangular brace.

In another exemplary embodiment, a method for cooling a back surface of a photovoltaic panel is described, comprising: constructing a rectangular float having a divided top platform and a first wall, a second wall opposite the first wall, a third wall connected to a first end of the first wall and to a first end of the second wall, and a fourth wall opposite the third wall; constructing a cross-shaped support and fitting the cross-shaped support between the four walls of the rectangular float; placing a set of four plastic drums into openings formed by the cross-shape of the cross-shaped support; connecting a first triangular brace to a first side of the divided top platform; connecting a second triangular brace to a second side of the divided top platform; connecting a bi-facial solar photovoltaic panel configured to generate electrical power from solar radiation to the first triangular brace and the second triangular brace; connecting a control panel cabinet to the cross-shaped support; operatively connecting the bi-facial solar photovoltaic panel to an inverter located in the control panel cabinet; floating the rectangular in a body of water; generating, by the bi-facial solar photovoltaic panel, an analog electrical current; transforming, by the inverter, the analog electrical current to a DC current; operatively connecting at least one temperature sensor to a top side of the bi-facial solar photovoltaic panel, at least one temperature sensor to a bottom side of the bi-facial solar photovoltaic panel, at least one temperature sensor below the rectangular float, and a solar irradiance sensor to a top side of the bi-facial solar photovoltaic panel; generating, by the temperature sensors and the solar irradiance sensor, sensor measurements; operatively connecting each temperature sensor and the solar irradiance sensor to a data logger located within the control panel cabinet; operatively connecting a voltage meter and a current meter to the inverter; generating, by the voltage meter and the current meter, voltage measurements and current measurements respectively; transmitting, by the inverter, the voltage measurements and current measurements to the data logger; collecting, by the data logger, the sensor measurements, the voltage measurements and the current measurements at predetermined time intervals; timestamping, by the data logger, the sensor measurements, the voltage measurements and the current measurements; wirelessly transmitting, by the data logger, the timestamped sensor measurements, the timestamped voltage measurements and the timestamped current measurements to a central database; storing the timestamped sensor measurements in the central database; operatively connecting a battery charger to at least one rechargeable battery located within the control panel cabinet; and transmitting, by the inverter, the DC current to the battery charger, wherein the battery charger is configured to charge the at least one rechargeable battery with the DC current during a charge session and transmit the DC current over an underwater cable to a shore based electric power station during a discharge session.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
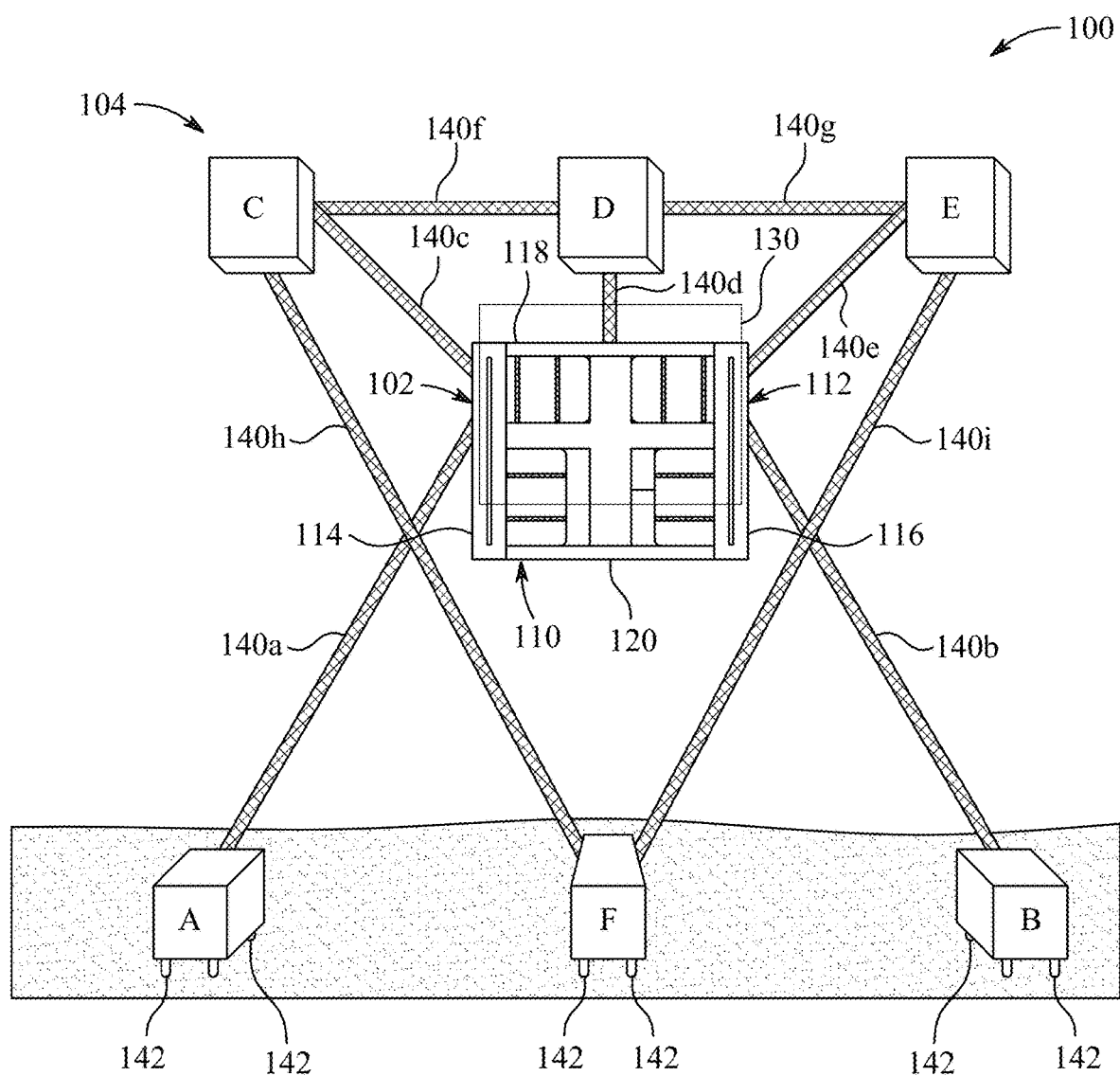
FIG. 1 is an exemplary diagram of a floating solar photovoltaic system having a floating solar photovoltaic assembly and an anchoring system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a floating solar photovoltaic system and a method for cooling a back surface of a photovoltaic panel through integration of marine environmental factors. The system and the method of the present disclosure utilizes advanced thermal management principles through controlled water-surface proximity effects, while incorporating environmental monitoring and data acquisition capabilities. The system and method of the present disclosure provide efficient photovoltaic conversion through sensing panel operating temperatures, facilitated by engineered heat dissipation mechanisms and real-time performance monitoring. This approach addresses limitations in conventional photovoltaic system deployment, including thermal degradation effects, environmental exposure impacts, and operational stability in marine environments, while providing automated response capabilities for varying environmental conditions.

Referring to FIG. 1, illustrated is a diagram of a floating solar photovoltaic system (as represented by reference numeral 100). The floating solar photovoltaic system 100 of the present disclosure provides an integrated technological platform that utilizes multiple engineering disciplines to achieve enhanced operational characteristics in marine environments. The floating solar photovoltaic system 100 incorporates structural engineering principles for platform stability, advanced environmental monitoring capabilities, and intelligent power management systems within a unified deployment framework. This multi-modal approach provides energy generation efficiency, structural durability, and environmental adaptability through coordinated operation of integrated subsystems. The floating solar photovoltaic system 100 is suitable for deployment across diverse marine environments, including coastal waters, reservoirs, and industrial water bodies, while maintaining operational stability under varying environmental conditions including tidal fluctuations, wave action, and wind loading. The architecture of the floating solar photovoltaic system 100 supports scalable deployment configurations, enabling adaptation to varying installation requirements while maintaining consistent performance characteristics across different operational scenarios.

As illustrated in FIG. 1, the floating solar photovoltaic system 100 includes a floating solar photovoltaic assembly 102 and an anchoring system 104. The floating solar photovoltaic assembly 102 is positioned within a body of water at a predetermined distance from a shore. The floating solar photovoltaic assembly 102 maintains a fixed position at a water depth between 1 to about 5 meters through the arranged configuration of the anchoring system 104, facilitating consistent operational characteristics under varying environmental conditions including tidal variations, wave action, and wind forces. The geometric arrangement of connections between the floating solar photovoltaic assembly 102 and the anchoring system 104 provides multi-directional stability while accommodating natural water movement. The floating solar photovoltaic assembly 102 maintains an installation distance in a range of 10 meters to about 60 meters from the shore, with the anchoring system 104 providing positional stability through a distributed network of anchor points extending from the shore to the submerged positions within the body of water. The maximum depth of the concrete blocks of the anchoring system 104 is a function of the depth of the body of water and the environmental conditions, such as wind and tide. In the experimental prototype of the present disclosure, the maximum water depth was 1.5 meters and the maximum distance from the shore was 25 meters.

The anchoring system 104 helps with the overall stability and performance of the floating solar photovoltaic system 100. In particular, the anchoring system 104 connects to the floating solar photovoltaic assembly 102 through multiple plastic-coated stainless-steel wires arranged in a specified geometric configuration. The anchoring system 104 includes concrete blocks positioned both on the shore and submerged within the body of water. Herein, the concrete blocks on the shore provide primary stabilization while the submerged concrete blocks maintain positional stability of the floating solar photovoltaic assembly 102 under varying marine conditions. The concrete blocks of the anchoring system 104 are interconnected through additional plastic-coated stainless-steel wires to form a comprehensive stabilization network. The anchoring system 104, with its specific components, configurations, and arrangement, will be discussed in further detail later in this description.

Figure 2A:
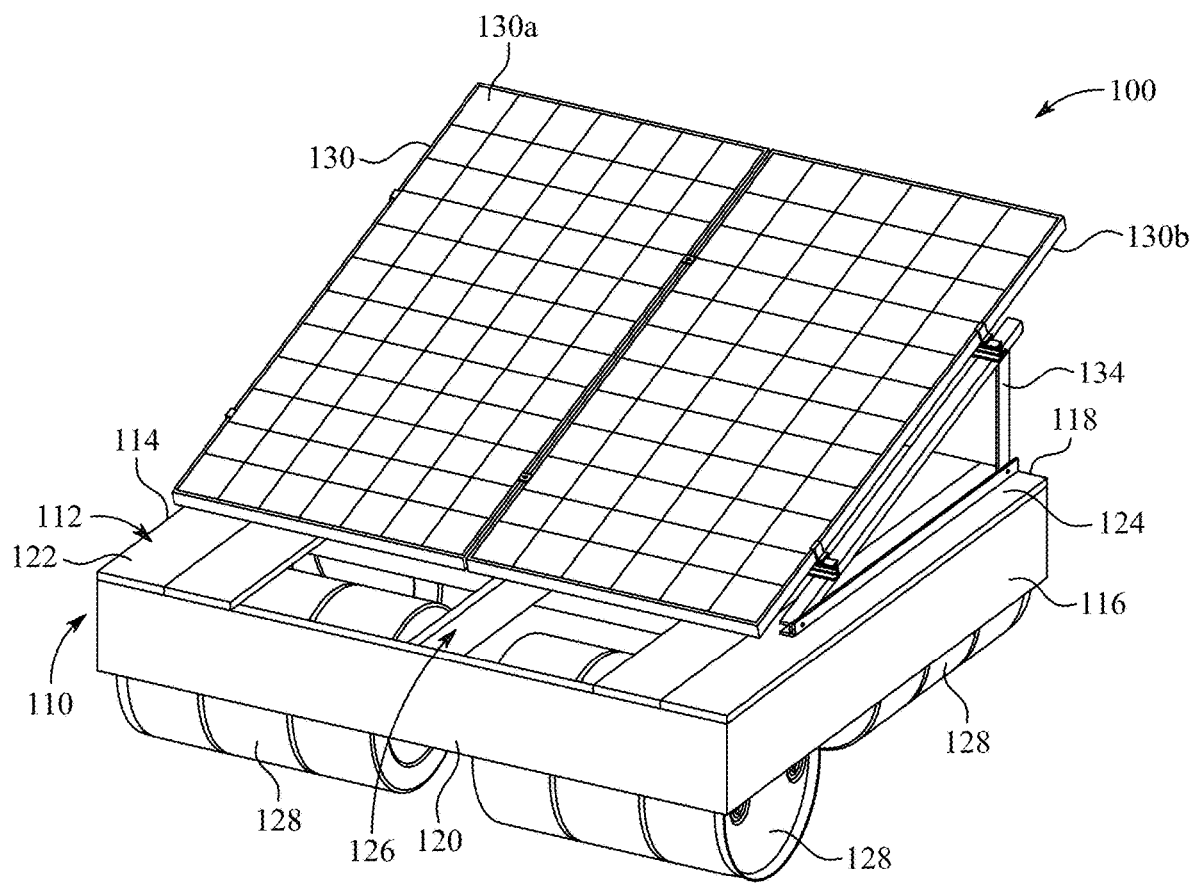
FIG. 2A is an exemplary front perspective diagram of the floating solar photovoltaic assembly of the floating solar photovoltaic system, according to certain embodiments.
Figure 2B:
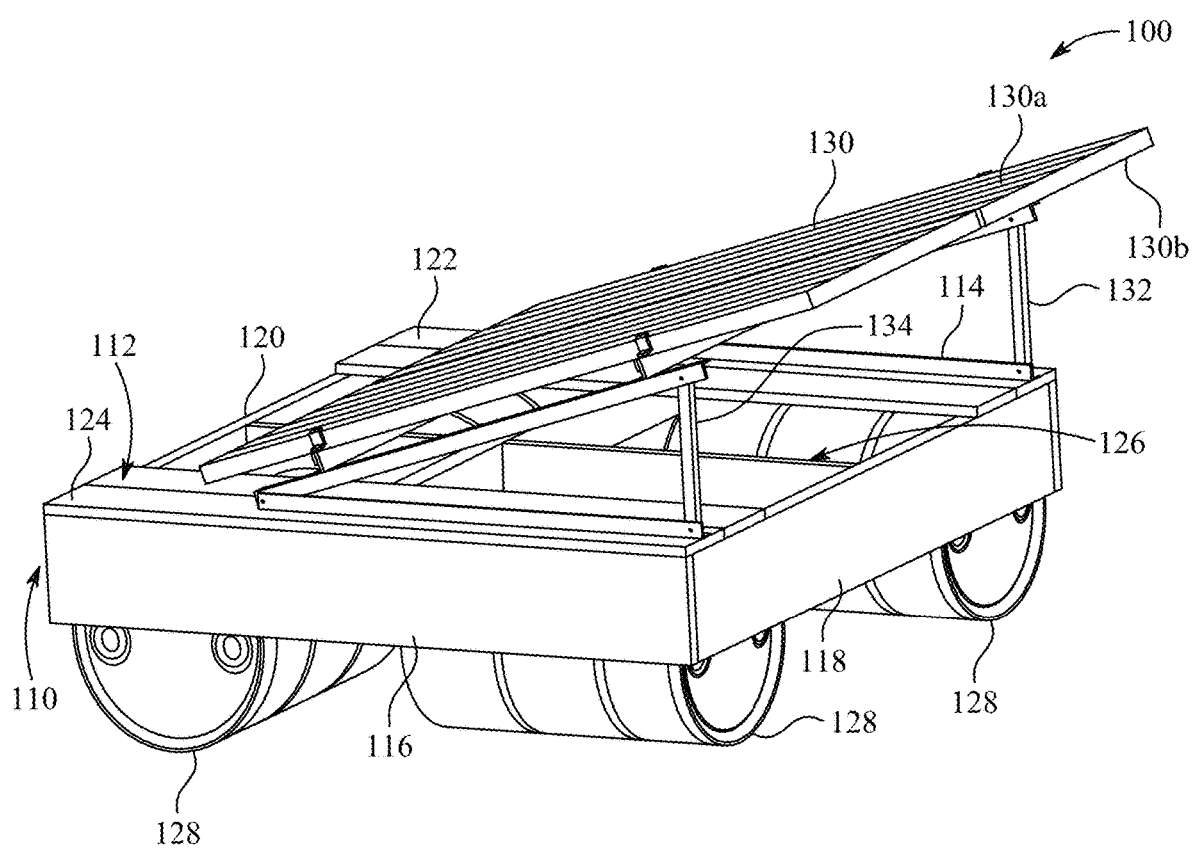
FIG. 2B is an exemplary side perspective diagram of the floating solar photovoltaic assembly, according to certain embodiments.
Figure 2C:
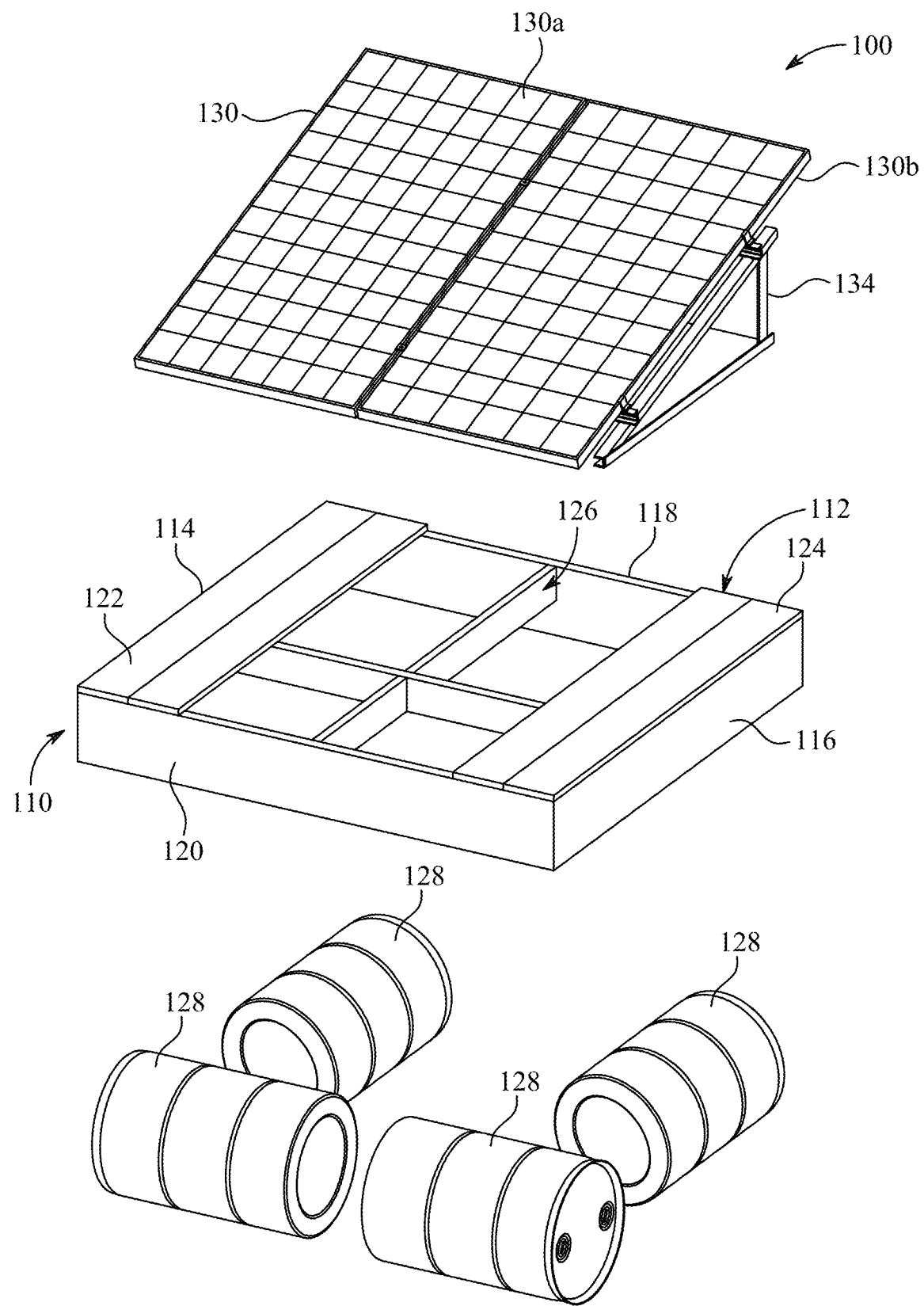
FIG. 2C is an exemplary exploded diagram of the floating solar photovoltaic assembly, according to certain embodiments.

Referring now to FIGS. 2A-2C in combination, the floating solar photovoltaic system 100, or specifically the floating solar photovoltaic assembly 102 includes a rectangular float 110 having a divided top platform 112 and a first wall 114, a second wall 116 opposite the first wall 114, a third wall 118 connected to a first end of the first wall 114 and to a first end of the second wall 116, and a fourth wall 120 opposite the third wall 118. The rectangular float 110 forms a unified structure in which the divided top platform 112 is secured to the first wall 114, the second wall 116, the third wall 118, and the fourth wall 120. The first wall 114, the second wall 116, the third wall 118, and the fourth wall 120 are arranged perpendicular to the divided top platform 112, forming a rectangular enclosure. The divided top platform 112 includes a first side 122 and a second side 124 configured to support photovoltaic components. The walls of the rectangular float 110 are dimensioned and positioned to accommodate internal support structures while maintaining proper buoyancy characteristics. The divided top platform 112 provides a stable mounting surface while allowing access to internal components of the floating solar photovoltaic assembly 102.

The floating solar photovoltaic assembly 102 also includes a cross-shaped support 126 configured to fit between the four walls 114, 116, 118, 120 of the rectangular float 110. The cross-shaped support 126 is dimensioned to establish contact with interior surfaces of the first wall 114, the second wall 116, the third wall 118, and the fourth wall 120. The cross-shaped support 126 extends from the center of the rectangular float 110 outward to each wall in a symmetrical configuration, forming four distinct compartments within the rectangular float 110. The cross-shaped support 126 is secured to the walls of the rectangular float 110, establishing a rigid internal framework that maintains the geometric integrity of the rectangular float 110. The perpendicular arms of the cross-shaped support 126 extend fully between opposing walls of the rectangular float 110, providing both structural reinforcement and precise spacing for additional components.

In an aspect of the present disclosure, the rectangular float 110 and the cross-shaped support 126 are coated with marine-grade polyurethane wood sealant. The marine-grade polyurethane wood sealant may include a two-part polyurethane formulation applied to all wooden surfaces of both the rectangular float 110 and the cross-shaped support 126. The coating provides water resistance characteristics necessary for sustained operation in marine environments while simultaneously offering protection against ultraviolet radiation exposure. The marine-grade polyurethane wood sealant prevents deterioration of wooden components and extends operational lifespan of the floating solar photovoltaic system 100. The marine-grade polyurethane wood sealant establishes a uniform protective barrier across all treated surfaces of the rectangular float 110 and the cross-shaped support 126, ensuring consistent environmental protection throughout the structure.

In the present configuration, a plurality of stainless-steel screws (not shown) are configured to connect the walls 114, 116, 118, 120, the divided top platform 112 and the cross-shaped support 126 together in the floating solar photovoltaic assembly 102. The stainless-steel screws establish rigid mechanical connections between structural components while providing corrosion resistance in marine environments. The connection points established by the stainless-steel screws maintain structural integrity of the floating solar photovoltaic assembly 102 while accommodating environmental stresses and dynamic loads encountered in marine deployment conditions.

The floating solar photovoltaic assembly 102 further includes a set of four pontoons 128. Herein, the cross-shaped support 126 is configured to hold each one of the four pontoons 128 within openings formed by the cross-shape of the cross-shaped support 126. The four pontoons 128 are positioned symmetrically within the compartments created by the perpendicular arms of the cross-shaped support 126, with each pontoon 128 occupying one quadrant of the rectangular float 110. The positioning of the pontoons 128 within the openings of the cross-shaped support 126 enables the floating solar photovoltaic assembly 102 to maintain stability even during high tide conditions. Further, the placement of each pontoon 128 within the openings of the cross-shaped support 126 facilitates uniform weight distribution across the floating solar photovoltaic assembly 102, maintaining consistent flotation characteristics under varying environmental conditions.

In an aspect, the pontoons 128 are plastic drums. The pontoons 128 utilize plastic drums selected for natural flotation characteristics and environmental durability. The plastic drums serving as the pontoons 128 are positioned between the arms of the cross-shaped support 126 in an arrangement that permits controlled lateral movement, thereby enhancing structural flexibility under wave action. The plastic drums are selected based on their permeability and buoyancy characteristics for integration within the floating solar photovoltaic assembly 102 to ensure proper contribution to overall platform flotation. The integration of the plastic drums as the pontoons 128 represents an environmentally conscious approach through the repurposing of materials while simultaneously providing reliable buoyancy characteristics.

The floating solar photovoltaic assembly 102 further includes a bi-facial solar photovoltaic panel 130 configured to generate electrical power from solar radiation. The bi-facial solar photovoltaic panel 130 incorporates photovoltaic cells on both front and rear surfaces, enabling simultaneous power generation from direct solar radiation incident on a top side 130*a* thereof and reflected radiation captured by a bottom side 130*b* thereof. The dual-active-surface configuration of the bi-facial solar photovoltaic panel 130 enables enhanced power generation through capture of albedo radiation reflected from the water surface beneath the floating solar photovoltaic assembly 102. It may be appreciated that surface temperatures of the bi-facial solar photovoltaic panel 130 are regulated through proximity to the water surface, in which the water body acts as a natural heat sink to maintain operational temperatures within specified ranges. This operating temperature regulation of the bi-facial solar photovoltaic panel 130 minimizes formation of thermal hot spots, contributing to extended operational lifespan of the photovoltaic cells. The bi-facial solar photovoltaic panel 130 provides enhanced efficiency characteristics compared to conventional mono-facial panels through the combined effects of dual-surface radiation capture and improved thermal management. The configuration of the floating solar photovoltaic assembly 102 with the bi-facial solar photovoltaic panel 130 also aids in reducing dust accumulation as compared to ground-based installations while facilitating cleaning operations using available water resources from the deployment environment.

The floating solar photovoltaic assembly 102 further includes a first triangular brace 132 connected to the first side 122 of the divided top platform 112 and a second triangular brace 134 connected to the second side 124 of the divided top platform 112. In an aspect, the first triangular brace 132 and the second triangular brace 134 are constructed of stainless-steel, providing structural support for the bi-facial solar photovoltaic panel 130 while maintaining corrosion resistance in the marine environment. Each of the first triangular brace 132 and the second triangular brace 134 is equipped with mounting hardware configured to secure the bi-facial solar photovoltaic panel 130 upon the respective triangular brace 132, 134. In an exemplary configuration, the mounting hardware includes stainless-steel bolts, stainless-steel nuts and rubber washers (components not shown for clarity). Herein, the stainless-steel bolts and the stainless-steel nuts are utilized for mounting purposes, while the rubber washers provide vibration dampening between the stainless-steel bolts, the stainless-steel nuts, and the mounted components while maintaining watertight connections. The combination of stainless-steel fasteners and the rubber washers provides secure mounting while accommodating thermal expansion and structural movement under varying environmental conditions.

The mounting configuration established by the first triangular brace 132 and the second triangular brace 134 enables the bi-facial solar photovoltaic panel 130 to maintain optimal orientation while accommodating structural movement under varying environmental conditions. In an aspect, a hypotenuse of each triangular brace 132, 134 makes an angle with a base of the triangular brace 132, 134. This angular inclination angle is selected to orient the bi-facial solar photovoltaic panel 130 for solar radiation capture based on geographical deployment location parameters. In a non-limiting example, the angle is about five degrees. In particular, a five-degree angular configuration enables effective utilization of both direct incident radiation on the top surface 130*a* and reflected radiation captured by the bottom surface 130*b* of the bi-facial solar photovoltaic panel 130.

Figure 3:
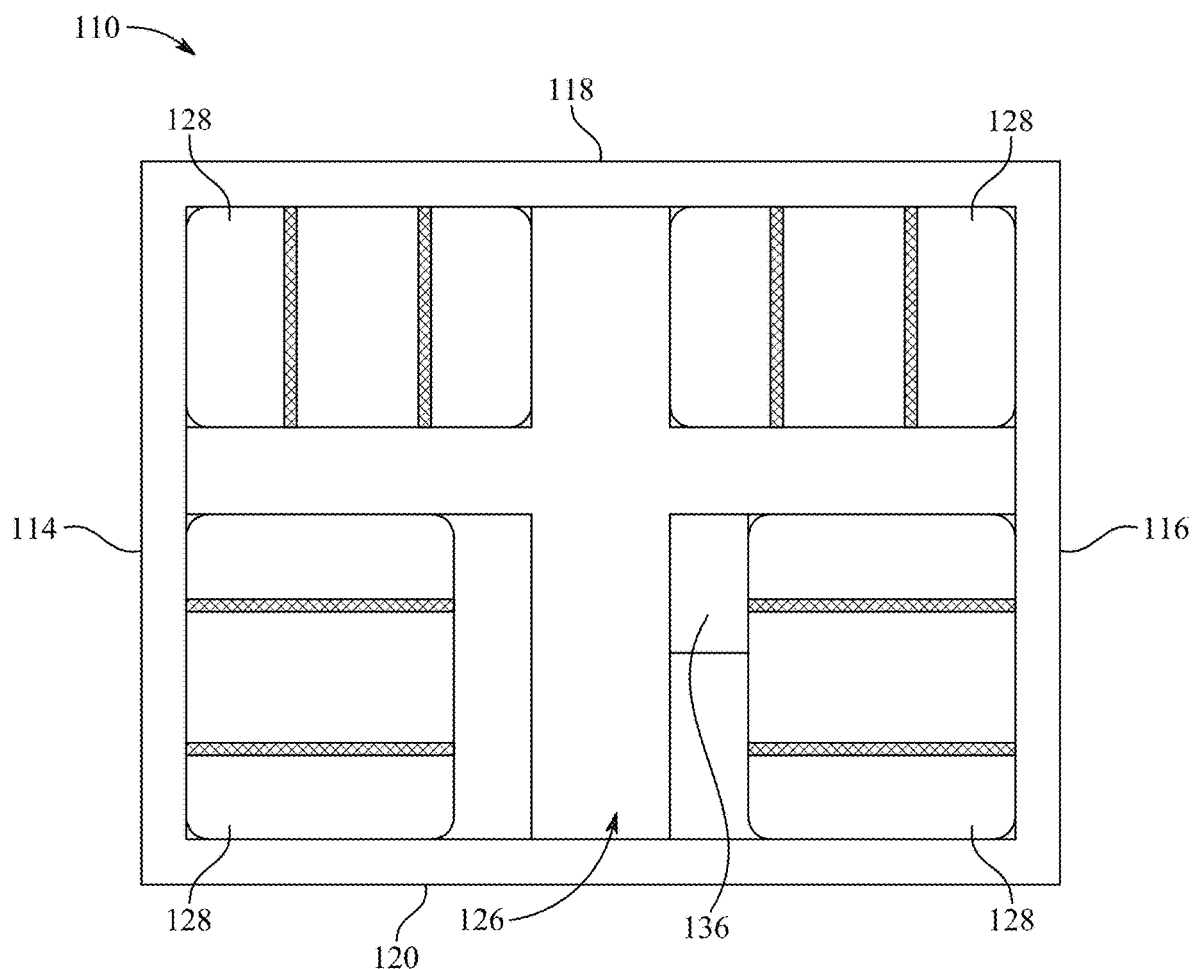
FIG. 3 is an exemplary top planar diagram depicting configuration of a rectangular float with a cross-shaped support and pontoons, of the floating solar photovoltaic system, according to certain embodiments.

FIG. 3 is an exemplary top planar diagram of the floating solar photovoltaic assembly 102 without the bi-facial solar photovoltaic panel 130 and the triangular braces 132, 134, showing the configuration of the rectangular float 110 with the cross-shaped support 126 and the pontoons 128 therein. As shown, the floating solar photovoltaic assembly 102 further includes a control panel cabinet 136 connected to the cross-shaped support 126. The control panel cabinet 136 houses electronic control components and monitoring systems for the floating solar photovoltaic assembly 102, providing environmental protection for sensitive electrical equipment. The control panel cabinet 136 maintains physical connection to the cross-shaped support 126 through the mounting hardware. The positioning of the control panel cabinet 136 on the cross-shaped support 126 enables access for maintenance operations while maintaining protection against environmental exposure in marine deployment conditions.

In an aspect, each triangular brace 132, 134, the stainless-steel bolts, the stainless-steel nuts, the stainless-steel screws and the control panel cabinet 136 has a rust coating comprising a zinc-rich primer having a thickness in a range of about fifty microns to about seventy-five microns. Herein, the zinc-rich primer contains zinc dust suspended in an epoxy binder. Further, the zinc dust contains zinc in an amount of 80 wt. % of the zinc dust. Such zinc-rich primer provides protection through corrosion of zinc content before base metal oxidation occurs. The primer coating provides adhesion characteristics while also providing resistance against sea salt exposure and elevated humidity conditions characteristic of marine environments. The zinc-rich primer layer, through consistent application thickness and composition control, creates a uniform protective barrier across all metallic components.

Further, each triangular brace 132, 134, the stainless-steel bolts, the stainless-steel nuts, the stainless-steel screw and the control panel cabinet 136 are further coated with a two-part epoxy paint over the rust coating. Herein, the two-part epoxy paint has a thickness in a range of about seventy-five microns to about one hundred microns. The two-part epoxy paint maintains strong adhesion characteristics with the zinc-rich primer layer while providing additional environmental protection for all metallic components. The epoxy paint composition forms a hard surface layer providing resistance to water penetration, chemical exposure, and mechanical abrasion. The combined coating system of zinc-rich primer and two-part epoxy paint provides complete corrosion protection for metallic components exposed to marine environmental conditions.

Referring back to FIG. 1, the anchoring system 104 of the floating solar photovoltaic system 100 includes a plurality of concrete blocks A-F and a plurality of plastic-coated stainless-steel wires 140a-140i connected to the plurality of concrete blocks A-F and the walls 114, 116, 118, 120 of the rectangular float 110. A first plastic-coated stainless-steel wire 140a is connected between a first concrete block A and a center of the first wall 114. A second plastic-coated stainless-steel wire 140b is connected between a second concrete block B and a center of the second wall 116. A third plastic-coated stainless-steel wire 140c is connected between a third concrete block C and a first corner of the rectangular float 110, in which the first corner is located at an intersection of the first wall 114 and the third wall 118. A fourth plastic-coated stainless-steel wire 140d is connected between a fourth concrete block D and a center of the third wall 118. A fifth plastic-coated stainless-steel wire 140e is connected between a fifth concrete block E and a second corner of the rectangular float 110, in which the second corner is located at an intersection of the third wall 118 and the second wall 116. A sixth plastic-coated stainless-steel wire 140f is connected between the third concrete block C and the fourth concrete block D. A seventh plastic-coated stainless-steel wire 140g is connected between the fourth concrete block D and the fifth concrete block E. An eighth plastic-coated stainless-steel wire 140h is connected between the third concrete block C and a sixth concrete block F. A ninth plastic-coated stainless-steel wire 140i is connected between the fifth concrete block E and the sixth concrete block F. The plurality of plastic-coated stainless-steel wires 140a-140i establish a network of connections that distribute anchoring forces across multiple attachment points. The arrangement of the plastic-coated stainless-steel wires 140a-140i creates primary stability connections through direct attachment to the rectangular float 110 while secondary interconnections between concrete blocks enhance overall system stability. It may be noted that the plastic coating on the stainless-steel wires provides additional protection against marine environmental conditions while maintaining the tensile strength characteristics of the stainless-steel core material.

For present purposes, the first concrete block A, the second concrete block B, and the sixth concrete block F are positioned on the shore (shown as dotted region holding the concrete blocks A, B and F, abutting the body of water (undotted region), and the third concrete block C, the fourth concrete block D, and the fifth concrete block E are positioned on the floor of the body of water. This strategic positioning creates an anchoring matrix that maintains stability of the floating solar photovoltaic system 100, specifically the floating solar photovoltaic assembly 102 therein, under varying environmental conditions including tidal variations, wave action, and wind forces. In an example, each of the plurality of concrete blocks A-F are precisely dimensioned cubic structures has a cubical dimension of about 381 mm$^3$ and a weight of about 144 kg. Such cubic structural configuration, with the given dimensions and weight, for the plurality of concrete blocks A-F provide stable support, as required for the floating solar photovoltaic system 100.

In an aspect, as illustrated in FIG. 1, each of the plurality of concrete blocks A-F has a bottom side including six U-shaped steel hooks 142 configured to anchor the concrete block into one of the shore and the floor of the water body. In the illustration of FIG. 1, the concrete blocks A, B and F have been shown with U-shaped steel hooks 142 (with not all six of the U-shaped steel hooks 142 being visible). The six U-shaped steel hooks 142 are symmetrically arranged on the bottom side of each concrete block, providing multi-directional anchoring capability for enhanced stability. The configuration of the U-shaped steel hooks 142 enables secure anchoring into substrate materials found in both shore and underwater environments, providing firm position to the concrete blocks A-F under varying load conditions. In an example, each of the six U-shaped steel hooks 142 has a length of about 203 millimeters. This specific dimensional parameter enables sufficient penetration depth into the substrate material for resistance against lateral and vertical forces encountered in marine deployment conditions, while maintaining appropriate structural proportions relative to the cubic dimensions of the concrete blocks A-F. The U-shaped configuration of the steel hooks 142, combined with the specified length dimension, establishes a mechanical interlock between the concrete blocks A-F and the underlying substrate material, contributing to the overall stability of the floating solar photovoltaic system 100. Each concrete block may have more than six U-shaped steel hooks 142 as needed, to ensure the concrete block firmly engages the bottom surface of the body of water. A tidal environment or a high wind environment may require that the float be anchored with heavier and larger concrete blocks, that the U-shaped anchors are longer or that there may be more than six U-shaped anchors.

Figure 4:
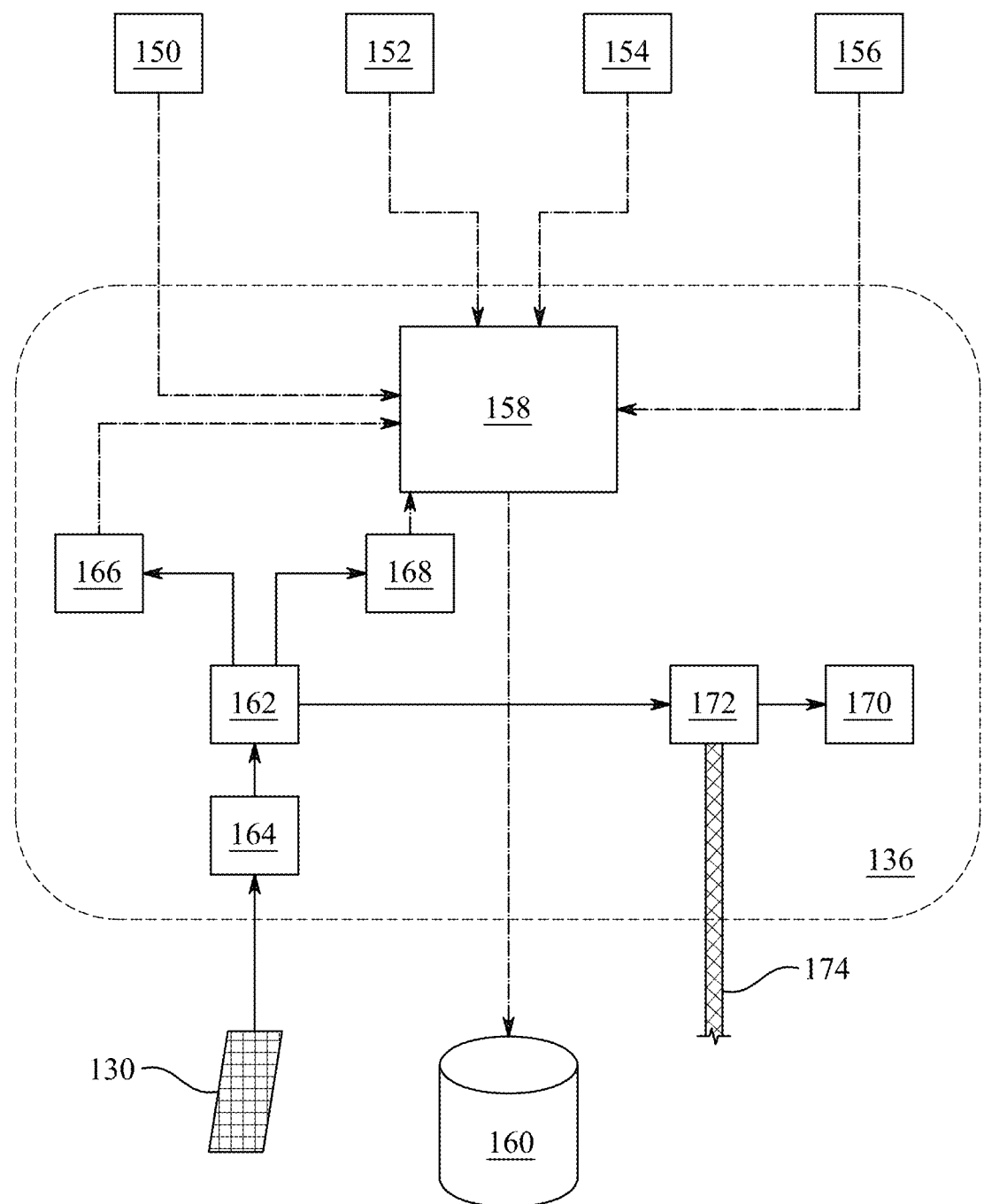
FIG. 4 is an exemplary schematic diagram depicting connections and communication between components for controlling operations of the floating solar photovoltaic system, according to certain embodiments.

Referring to FIG. 4, illustrated is an exemplary schematic diagram depicting connections and communication between various components of the floating solar photovoltaic system 100. The floating solar photovoltaic system 100 includes a plurality of sensors for monitoring conditions which aids in controlling operations thereof. In particular, the floating solar photovoltaic system 100 includes at least one first temperature sensor 150 located on the top side 130a of the bi-facial solar photovoltaic panel 130. The first temperature sensor 150 is configured for continuous monitoring of surface temperature conditions at the top side 130a, for evaluating thermal loading on the top side 130a of the bi-facial solar photovoltaic panel 130 under varying solar radiation conditions. The floating solar photovoltaic system 100 also includes at least one second temperature sensor 152 located on the bottom side 130b of the bi-facial solar photovoltaic panel 130. The second temperature sensor 152 is configured for continuous monitoring of temperature conditions at the bottom side 130b, facilitating measurement of thermal gradients between the top and bottom surfaces of the bi-facial solar photovoltaic panel 130 which helps to evaluate cooling effects from water surface proximity. The floating solar photovoltaic system 100 further includes at least one third temperature sensor 154 attached below the rectangular float 110. The third temperature sensor 154 is configured for continuous monitoring of water temperature conditions in the immediate vicinity of the floating solar photovoltaic system 100, which provides measurement of thermal conditions in the water body serving as a natural heat sink for the floating solar photovoltaic system 100 for evaluating heat dissipation characteristics. The floating solar photovoltaic system 100 further includes a solar irradiance sensor 156 located on the top side 130a of the bi-facial solar photovoltaic panel 130. The solar irradiance sensor 156 is configured for measurement of incident solar radiation intensity at the top side 130*a*, which is the primary collection surface. The solar irradiance sensor 156 provides continuous monitoring of available solar energy for correlation with photovoltaic panel performance parameters. The data from the solar irradiance sensor 156 enables evaluation of conversion efficiency under varying environmental conditions.

The floating solar photovoltaic system 100 further includes a data logger 158 located within the control panel cabinet 136 and operatively connected to each of the plurality of sensors 150, 152, 154, 156. That is, the data logger 158 is installed within the control panel cabinet 136 and establishes operative connections with the first temperature sensor 150, the second temperature sensor 152, the third temperature sensor 154, and the solar irradiance sensor 156. Herein, the data logger 158 is configured to collect sensor measurements at predetermined time intervals, time stamp the sensor measurements and wirelessly transmit the timestamped sensor measurements to a central database 160 configured to store the timestamped sensor measurements. The central database 160 may be located in any of a shore installation, a remote monitoring center, a cloud-based computer data store, and the like. The data logger 158 performs automated collection of sensor measurements at predetermined time intervals, applying timestamp data to each measurement point. The data logger 158 may incorporate wireless communication capabilities for transmission of timestamped sensor measurements to the central database 160 configured for long-term data storage and analysis.

In some aspects, the floating solar photovoltaic system 100 includes an inverter 162 located within the control panel cabinet 136. The inverter 162 is configured to convert power from the electrical output of the bi-facial solar photovoltaic panel 130. The inverter 162 also maintains operational connection with multiple system components while being protected from environmental exposure through installation within the control panel cabinet 136. The floating solar photovoltaic system 100 further includes a junction box 164 connected to the bi-facial solar photovoltaic panel 130, establishing physical and electrical connection therewith. The junction box 164 is also operatively connected to the inverter 162. The junction box 164 facilitates transmission of an analog electrical current generated by the bi-facial solar photovoltaic panel 130 to the inverter 162. Herein, the inverter 162 is configured to transform the analog electrical current generated by the bi-facial solar photovoltaic panel 130 to a DC current. The junction box 164 provides a protected interface point for electrical connections while maintaining environmental isolation of connection points between the bi-facial solar photovoltaic panel 130 and the inverter 162.

The floating solar photovoltaic system 100 further includes a current sensor 166 operatively connected to the inverter 162 and a voltage sensor 168 operatively connected to the inverter 162, providing continuous monitoring of electrical parameters therein. The current sensor 166 and the voltage sensor 168 are configured to transmit current measurements and voltage measurements respectively to the data logger 158. The data logger 158 is configured to timestamp the current measurements and the voltage measurements, and wirelessly transmit the timestamped current measurements and the timestamped voltage measurements to the central database 160 configured to store the timestamped current measurements and the timestamped voltage measurements. The combination of the current sensor 166 and the voltage sensor 168 facilitates monitoring of power conversion efficiency through correlation of electrical parameters with environmental conditions measured by the temperature sensors 150, 152, 154 and the solar irradiance sensor 156, in the floating solar photovoltaic system 100.

In some aspects, the floating solar photovoltaic system 100 also includes at least one rechargeable battery 170 located within the control panel cabinet 136. The rechargeable battery 170 is configured to provide energy storage capability for the floating solar photovoltaic system 100. The rechargeable battery 170 maintains operative connection with the inverter 162 through protected electrical interfaces within the control panel cabinet 136. The installation location of the rechargeable battery 170 provides environmental protection while facilitating access for maintenance operations through the control panel cabinet 136. The floating solar photovoltaic system 100 further includes a battery charger 172 operatively connected to the rechargeable battery 170. Herein, the inverter 162 is configured to transmit the DC current to the battery charger 172, and the battery charger 172 is configured to charge the rechargeable battery 170 with the DC current. The battery charger 172 receives the DC current from the inverter 162 and implements charging protocols for the rechargeable battery 170. The floating solar photovoltaic system 100 may further include an underwater cable 174 connected to the battery charger 172 and a shore based electric power station (not shown).

In an aspect, the battery charger 172 is a maximum power point tracking converter configured to charge the at least one rechargeable battery 170 with the DC current during a charge session and transmit the DC current over the underwater cable to the shore based electric power station during a discharge session. The battery charger 172 incorporates maximum power point tracking functionality for control of charging operations based on available solar energy and battery condition parameters. The battery charger 172, configured as the maximum power point tracking converter, implements dual-mode operation in in which DC current charges the rechargeable battery 170 during charge sessions and transmits power through the underwater cable 174 during discharge sessions. In particular, the maximum power point tracking converter is configured to monitor the sensor measurements and turn OFF the bi-facial solar photovoltaic panel 130 when the temperature measurement of at least one temperature sensor 152 located on the bottom side 130*b* of the bi-facial solar photovoltaic panel 130 is greater than the temperature measurement of at least one temperature sensor 150 located on the top side 130*a* of the bi-facial solar photovoltaic panel 130. That is, upon detection of temperature conditions in which measurements from the temperature sensor 152 on the bottom side 130*b* which exceed measurements from the temperature sensor 150 on the top side 130*a*, the maximum power point tracking converter initiates automatic deactivation of the bi-facial solar photovoltaic panel 130. This temperature-based control logic prevents operational conditions that could impact efficiency and/or longevity of the floating solar photovoltaic system 100.

Figure 5:
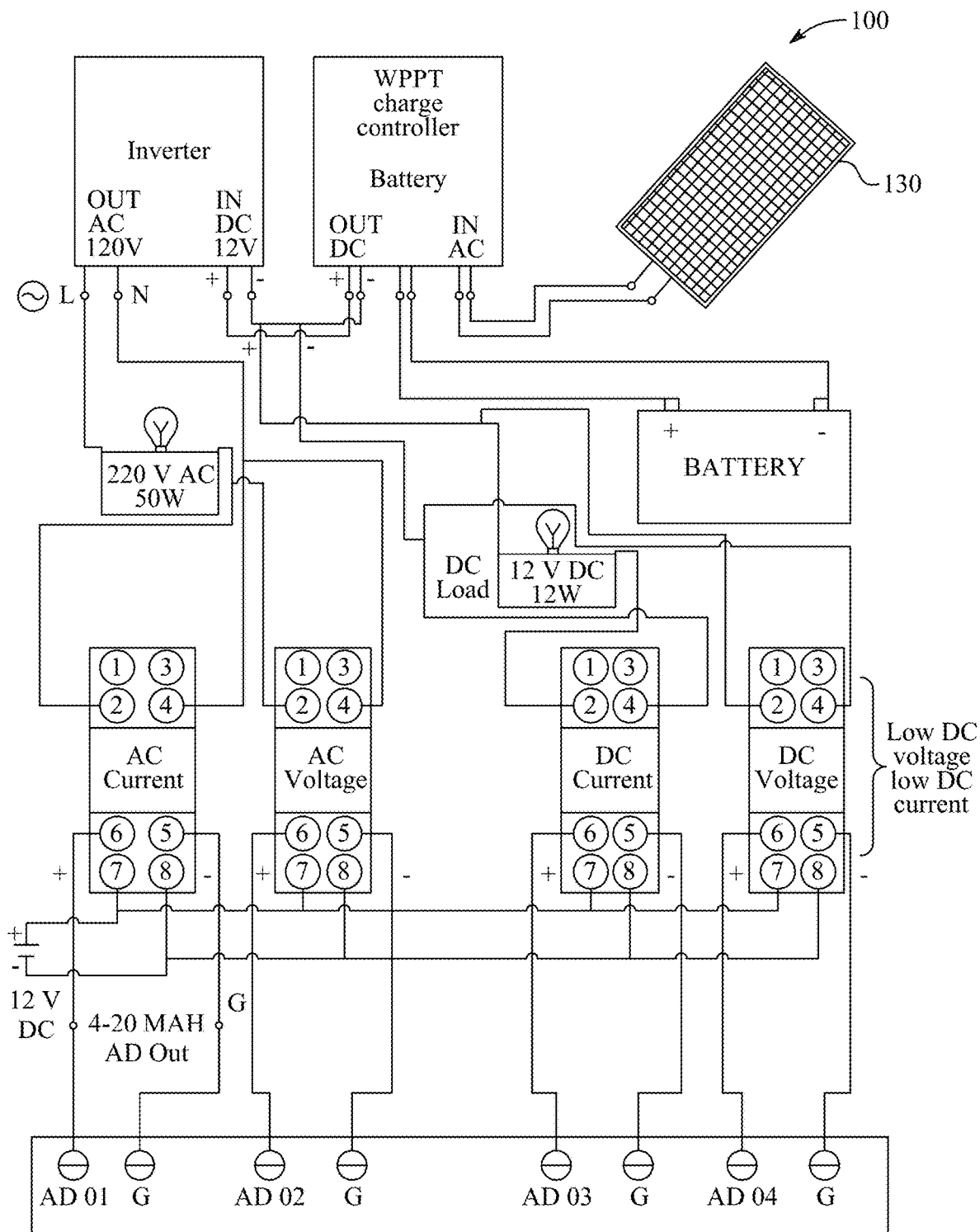
FIG. 5 is an exemplary electric circuit diagram for the floating solar photovoltaic system, according to certain embodiments.

FIG. 5 illustrates an electric circuit diagram for the floating solar photovoltaic system 100, depicting electrical interconnections between the bi-facial solar photovoltaic panel 130, the inverter 162, the battery charger 172 configured as a maximum power point tracking converter, and the rechargeable battery 170. The circuit diagram depicts integration of AC and DC monitoring systems, including the current sensor 166 and the voltage sensor 168 configured to transmit measurements to the data logger 158. The electrical architecture incorporates multiple measurement points for both AC and DC parameters, facilitating monitoring of system performance characteristics. The circuit configuration establishes power flow paths from the bi-facial solar photovoltaic panel 130 through the inverter 162 and the battery charger 172 to both the rechargeable battery 170 and the underwater cable 174. The circuit provides systematic integration of power generation, conversion, storage, and transmission capabilities within the floating solar photovoltaic system 100, while incorporating parameter monitoring through the data logger 158 for transmission to the central database 160.

Figure 6:
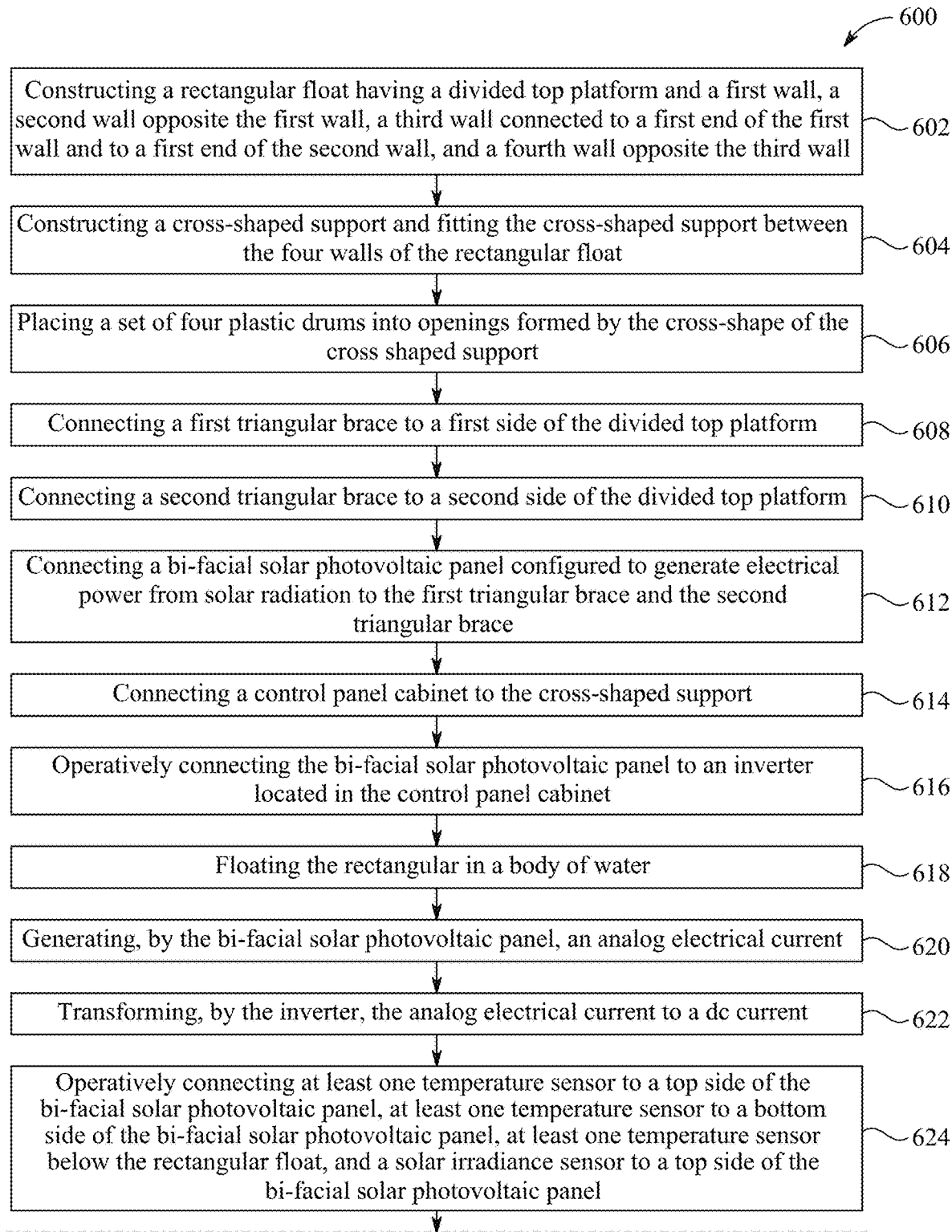
FIG. 6 is an exemplary flowchart listing steps involves in a method for cooling a back surface of a photovoltaic panel, according to certain embodiments.
Figure 6:
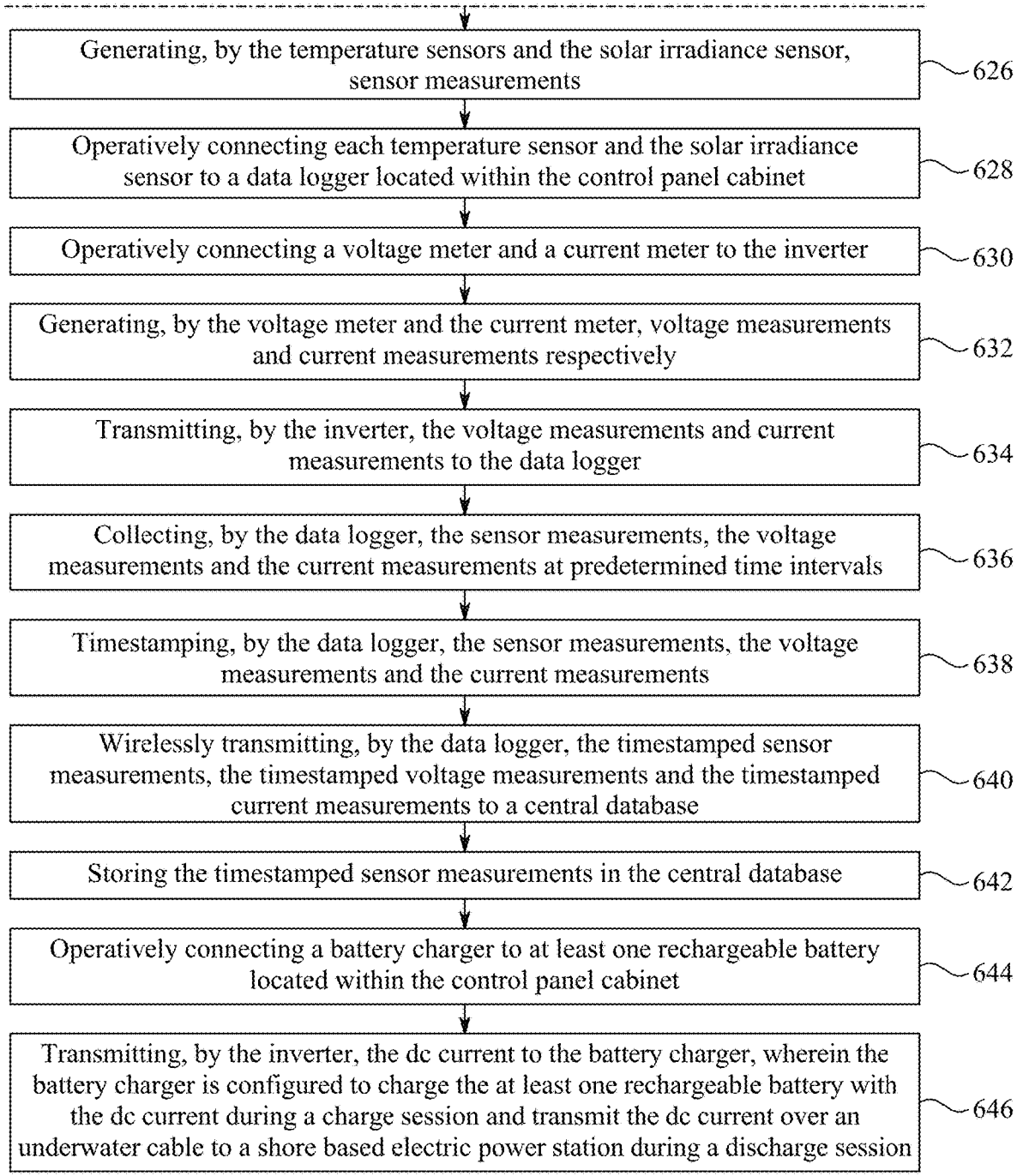

Referring now to FIG. 6, the present disclosure further provides a method (as represented by a flowchart, referred by reference numeral 600) for cooling a back surface (same as the bottom side 130*b*) of a photovoltaic panel (same as the bi-facial solar photovoltaic panel 130), with these terms being interchangeably used hereinafter. The method 600 includes a series of steps. These steps are only illustrative, and other alternatives may be considered where one or more steps are added, one or more steps are removed, or one or more steps are provided in a different sequence without departing from the scope of the present disclosure. Various variants disclosed above, with respect to the aforementioned floating solar photovoltaic system 100 apply mutatis mutandis to the present method 600.

At step 602, the method 600 includes constructing the rectangular float 110 having the divided top platform 112 and the first wall 114, the second wall 116 opposite the first wall 114, the third wall 118 connected to a first end of the first wall 114 and to a first end of the second wall 116, and the fourth wall 120 opposite the third wall 118. The construction process involves assembling the divided top platform 112 and the walls 114, 116, 118, 120 using stainless-steel screws to establish rigid mechanical connections. The assembly establishes perpendicular orientation between the divided top platform 112 and the walls 114, 116, 118, 120, forming a rectangular enclosure configured to accommodate internal support structures. In some examples, the components of the rectangular float 110 are applied with marine-grade polyurethane wood sealant coating to ensure protection against moisture and microbial decomposition in aquatic environments.

At step 604, the method 600 includes constructing the cross-shaped support 126 and fitting the cross-shaped support 126 between the four walls 114, 116, 118, 120 of the rectangular float 110. The cross-shaped support 126 is fabricated to dimensional specifications for fitting between interior surfaces of the walls 114, 116, 118, 120. The cross-shaped support 126 is secured to the walls 114, 116, 118, 120 using stainless-steel screws, establishing a rigid internal framework that maintains geometric integrity of the rectangular float 110. In present examples, the cross-shaped support 126 may also be applied with marine-grade polyurethane wood sealant identical to the coating applied to the rectangular float components.

At step 606, the method 600 includes placing each of a set of four plastic drums into openings formed by the cross-shape of the cross-shaped support 126. The plastic drums serving as pontoons 128 are positioned symmetrically within compartments created by the perpendicular arms of the cross-shaped support 126. The positioning enables controlled lateral movement of the plastic drums within the cross-shaped support 126, providing buoyancy and enhancing structural flexibility under wave action.

At step 608, the method 600 includes connecting the first triangular brace 132 to the first side 122 of the divided top platform 112. The first triangular brace 132 is positioned to establish a five-degree angle between the hypotenuse and base thereof, providing optimal orientation for subsequent photovoltaic panel mounting. In present examples, the first triangular brace 132 is fabricated from stainless-steel and receives an application of the protective coating comprising a zinc-rich primer followed by two-part epoxy paint.

At step 610, the method 600 includes connecting the second triangular brace 134 to the second side 124 of the divided top platform 112. The second triangular brace 134 is secured to establish matching five-degree angular orientation with respect to the divided top platform 112, ensuring symmetrical support configuration for the photovoltaic panel installation. In present examples, the second triangular brace 134 is constructed with identical material specifications and protective coatings as the first triangular brace 132.

At step 612, the method 600 includes connecting the bi-facial solar photovoltaic panel 130 to the first triangular brace 132 and the second triangular brace 134. The bi-facial solar photovoltaic panel 130 is secured using mounting hardware comprising stainless-steel bolts, stainless-steel nuts, and rubber washers. The mounting configuration establishes orientation of the bi-facial solar photovoltaic panel 130 for solar radiation capture through both the top surface 130*a* and the bottom surface 130*b* of the bi-facial solar photovoltaic panel 130 while enabling thermal regulation through proximity to the water surface.

At step 614, the method 600 includes connecting the control panel cabinet 136 to the cross-shaped support 126. The mounting location on the cross-shaped support 126 enables access for maintenance operations while providing protection for internal electrical components. In present examples, the control panel cabinet 136 receives application of protective coatings including the zinc-rich primer and two-part epoxy paint to ensure environmental protection.

At step 616, the method 600 includes operatively connecting the bi-facial solar photovoltaic panel 130 to the inverter 162 located in the control panel cabinet 136. The electrical connections are established through the junction box 164 which provides protected interface points between the bi-facial solar photovoltaic panel 130 and the power conversion system of the inverter 162. The connection configuration enables transmission of generated electrical power while maintaining environmental isolation of all connection points.

At step 618, the method 600 includes floating the rectangular float 110 in a body of water. The floating solar photovoltaic assembly 102 is positioned at a selected distance of ranging from about 10 meters to about 60 meters from the shore at a water depth ranging from about 1 meter to about 5 meters. The deployment enables natural cooling effects through water proximity while maintaining operational stability through the anchoring system 104. Although the distance from the shore in the example configuration has been selected in the 10 meters to about 60 meters range for practical considerations, a well-controlled reservoir, such as a dam or an inland pond, may allow placement farther from shore. However, the stability of the anchoring system may be affected by distance from the shore and depth of the water floor.

At step 620, the method 600 includes generating, by the bi-facial solar photovoltaic panel 130, an analog electrical current. The bi-facial solar photovoltaic panel 130 captures direct solar radiation through the top surface 130*a* while simultaneously utilizing reflected radiation captured by the bottom surface 130*b* to generate electrical power. The dual-surface configuration enables enhanced power generation through combined direct and reflected radiation capture.

At step 622, the method 600 includes transforming, by the inverter 162, the analog electrical current to a DC current.

The inverter 162 receives the analog electrical current through protected connection points established by the junction box 164. The power conversion process enables preparation of electrical output for subsequent storage or transmission operations.

At step 624, the method 600 includes operatively connecting at least one temperature sensor 150 to the top side 130*a* of the bi-facial solar photovoltaic panel 130, at least one temperature sensor 152 to the bottom side 130*b* of the bi-facial solar photovoltaic panel 130, at least one temperature sensor 154 below the rectangular float 110, and the solar irradiance sensor 156 to the top side 130*a* of the bi-facial solar photovoltaic panel 130. The temperature sensors 150, 152, 154 are positioned to facilitate monitoring of thermal conditions at critical measurement points throughout the floating solar photovoltaic system 100. The solar irradiance sensor 156 is utilized to determine correlation between available solar energy and system performance parameters.

At step 626, the method 600 includes generating, by the temperature sensors 150, 152, 154 and the solar irradiance sensor 156, sensor measurements. The temperature sensors 150, 152, 154 perform continuous monitoring of thermal conditions at designated measurement points throughout the floating solar photovoltaic system 100. The solar irradiance sensor 156 simultaneously generates measurements of incident solar radiation intensity at the top surface 130*a* of the bi-facial solar photovoltaic panel 130.

At step 628, the method 600 includes operatively connecting each temperature sensor 150, 152, 154 and the solar irradiance sensor 156 to the data logger 158 located within the control panel cabinet 136. The data logger 158 provides protected communication interfaces with each sensor through environmentally sealed connection points. The connections enable continuous transmission of measurement data from all sensors to the centralized data collection system.

At step 630, the method 600 includes operatively connecting the voltage sensor 168 and the current sensor 166 to the inverter 162. The voltage sensor 168 and current sensor 166 are configured to provide measurement capabilities for monitoring electrical parameters within the power conversion system. The voltage sensor 168 and the current sensor 166 facilitate continuous monitoring of power conversion efficiency through measurement of voltage and current characteristics at output of the inverter 162.

At step 632, the method 600 includes generating, by the voltage sensor 168 and the current sensor 166, voltage measurements and current measurements respectively. The voltage sensor 168 and the current sensor 166 perform continuous monitoring of electrical parameters at the output of the inverter 162. The measurements enable real-time evaluation of power conversion efficiency through the inverter 162.

At step 634, the method 600 includes transmitting, by the inverter 162, the voltage measurements and current measurements to the data logger 158. The data logger 158 receives continuous streams of electrical parameter measurements through communication interfaces. The transmission of measurement data facilitates integration of electrical parameters with environmental monitoring data within the centralized collection system.

At step 636, the method 600 includes collecting, by the data logger 158, the sensor measurements, the voltage measurements and the current measurements at predetermined time intervals. The data logger 158 implements synchronized data collection protocols for all measurement parameters. The collection process maintains temporal alignment between environmental measurements from the temperature sensors 150, 152, 154, the solar irradiance sensor 156, and electrical parameters from the voltage sensor 168 and current sensor 166.

At step 638, the method 600 includes timestamping, by the data logger 158, the sensor measurements, the voltage measurements and the current measurements. The data logger 158 applies time stamps to each measurement point collected from the temperature sensors 150, 152, 154, the solar irradiance sensor 156, the voltage sensor 168, and the current sensor 166. The timestamping process enables temporal correlation between environmental conditions and system performance parameters.

At step 640, the method 600 includes wirelessly transmitting, by the data logger 158, the timestamped sensor measurements, the timestamped voltage measurements and the timestamped current measurements to the central database 160. The data logger 158 implements wireless communication protocols for secure transmission of all measurement data. The transmission process maintains data integrity while enabling remote access to system performance information.

At step 642, the method 600 includes storing the timestamped sensor measurements in the central database 160. The central database 160 implements data management protocols for organizing and preserving all received measurement data. The storage process enables long-term analysis of system performance characteristics and environmental conditions.

At step 644, the method 600 includes operatively connecting the battery charger 172 to the at least one rechargeable battery 170 located within the control panel cabinet 136. The battery charger 172 establishes protected electrical connections for implementing controlled charging operations. The connection configuration enables power transfer between the inverter 162 and the rechargeable battery 170.

At step 646, the method 600 includes transmitting, by the inverter 162, the DC current to the battery charger 172, wherein the battery charger 172 is configured to charge the at least one rechargeable battery 170 with the DC current during a charge session and transmit the DC current over the underwater cable 174 to a shore based electric power station during a discharge session. The battery charger 172 implements maximum power point tracking protocols for charge and discharge operations. The dual-mode operation enables both energy storage and power transmission capabilities through controlled DC current management.

In present aspects, the method 600 further includes anchoring, by the first plurality of concrete blocks C, D, E each equipped with the six U-shaped steel hooks 142 and attached to one of the first set of plastic-coated stainless-steel wires 140*c*, 140*d*, 140*e*, the rectangular float 110 to a floor of the body of water. The concrete blocks C, D, E are positioned on the floor of the body of water at predetermined locations based on bathymetric survey data. The U-shaped steel hooks 142, each extending 203 millimeters in length, establish secure anchoring points through penetration into the floor substrate material. The method 600 also includes connecting, by the second set of plastic-coated steel wires 140*f*, 140*g*, each of the first plurality of concrete blocks C, D, E in a string. The plastic-coated steel wire 140*f* establishes connection between concrete blocks C and D, while plastic-coated steel wire 140*g* connects concrete blocks D and E. The interconnected configuration of concrete blocks creates a stabilized anchoring network beneath the water surface. The method 600 further includes anchoring, by the second plurality of concrete blocks A, B, F each equipped with the six U-shaped steel hooks 142 and attached to one of the third set of plastic-coated stainless-steel wires 140a, 140b, the rectangular float 110 to a shore abutting the body of water. The concrete blocks A, B, F are positioned on the shore to establish stabilization points for the floating solar photovoltaic system 100. The U-shaped steel hooks 142 penetrate the shore substrate to provide secure anchoring against environmental forces. The method 600 further includes connecting, by the fourth set of plastic-coated steel wires 140h, 140i, the first plurality of concrete blocks C, E to the second plurality of concrete blocks F located on the shore. The plastic-coated steel wire 140h connects the concrete block C to the concrete block F, while the plastic-coated steel wire 140i connects the concrete block E to the concrete block F. The shore-to-water connections complete the anchoring matrix, establishing a stable support network for the floating solar photovoltaic system 100 under varying environmental conditions.

The floating solar photovoltaic system 100 was subjected to performance evaluation through comparative analysis with a ground-based reference installation. The deployment configuration and environmental characteristics were documented to establish baseline operational parameters for system evaluation.

The floating solar photovoltaic system 100 (FPVS) was deployed at coordinates 26° 05'44"N, 50° 06'38.2"E, positioned at a distance of 25 meters from the shore within a water depth range of 1 to 1.5 meters. A reference ground-based photovoltaic installation was positioned at coordinates 26° 05'46.4" N, 50° 06'43.7" E, located 150 meters inland from the shore, providing direct performance comparison under identical environmental conditions. The geographical coordinates and deployment parameters for both installations are summarized in Table 3 (below).

TABLE 3

Geographical coordinates of the FPV and GPV systems deployed at KFUPM beach

| Systems | Latitude (°N) | Longitude (°E) | Comments |
| --- | --- | --- | --- |
| FPV | 26°05'44" | 50°06'38.2" | This system is deployed about 25 meters deep into the water away from the coast at a water depth of 1 to 1.5 meters |
| GPV | 26°05'46.4" | 50°06'43.7" | This system is installed inland 150 meters away from the coast. |

Experiments conducted at the deployment site demonstrated specific meteorological characteristics relevant to system operation. Tidal variations in the Dammam coastal region of the Arabian Gulf ranged from 0.1 meters to 1.6 meters in magnitude, with four daily cycles comprising two low and two high tides. The mean tidal range exhibited a decreasing gradient along the West Coast of the Arabian Gulf, transitioning from 3.0 meters near Kuwait to approximately 1.0 meters in the vicinity of Ras Tanura, Saudi Arabia. These tidal conditions presented specific operational challenges for maintaining positional stability of the floating solar photovoltaic system 100.

Long-term meteorological monitoring demonstrated significant parameter variations summarized in Table 4 (below). The ambient temperature measurements ranged between 15.3° C. in January and 35.9° C. in July, with corresponding relative humidity levels of 31.6% in June and 68.2% in December. Solar radiation intensity on horizontal surfaces varied between 3.28 and 7.73 kWh/m²/d, maintaining an overall mean of 5.60 kWh/m²/d. Atmospheric pressure measurements indicated moderate annual variation between 99.3 mb in July and 101.4 mb in January and December. Mean wind speed measurements at 10 meters above ground level demonstrated variation between 3.7 m/s and 5.4 m/s, corresponding to October and June respectively.

TABLE 4

Long-term meteorological data summary near the deployment site

| Month | Ambient Temperature (° C.) | Relative Humidity (%) | Daily Solar Radiation Horizontal (kWh/m²/d) | Atmospheric Pressure (mb) | Wind Speed (m/s) |
| --- | --- | --- | --- | --- | --- |
| Jan | 15.3 | 67.5 | 3.57 | 101.4 | 4.2 |
| Feb | 16.8 | 64.3 | 4.42 | 101.2 | 4.6 |
| Mar | 20.3 | 58 | 5.13 | 100.9 | 4.7 |
| Apr | 25.8 | 47.4 | 6.03 | 100.6 | 4.6 |
| May | 31.6 | 36.7 | 7.03 | 100.2 | 4.9 |
| Jun | 34.7 | 31.6 | 7.73 | 99.6 | 5.4 |
| Jul | 35.9 | 35.6 | 7.26 | 99.3 | 4.7 |
| Aug | 35.3 | 44.2 | 6.97 | 99.5 | 4.2 |
| Sep | 32.4 | 50.6 | 6.45 | 100.1 | 3.9 |
| Oct | 28.5 | 58.2 | 5.33 | 100.7 | 3.7 |
| Nov | 22.7 | 62.5 | 4 | 101.2 | 4.1 |
| Dec | 17.5 | 68.2 | 3.28 | 101.4 | 4.2 |
| Annual | 26.5 | 52 | 5.6 | 100.5 | 4.4 |

Further, the buoyancy and stability characteristics of the floating solar photovoltaic system 100 were evaluated through calculation of buoyancy forces and environmental loading. The buoyancy force ($F_b$) was determined according to the equation:

$$F_b = \rho \times V_c \times g \approx 554.4 N$$

where $\rho$ is density of seawater (1025 kg/m³), $V_c$ is volume of concrete block, g=acceleration due to gravity (9.81 m/s²).

The weight force (W) of the concrete blocks was calculated as:

$$W = m \times g \approx 1411.2 N W$$

where m is mass of concrete block (144 kg), and g is acceleration due to gravity (9.81 m/s²). The weight force (W) of the concrete blocks A-F must exceed the buoyancy force ($F_b$) to ensure submerged stability of the anchoring system 104. The calculated weight force of 1411.2 N exceeded the buoyancy force of 554.4 N, confirming that the concrete blocks A-F maintain submerged positions while providing stability to the floating solar photovoltaic system 100.

Environmental force analysis considered multiple force vectors acting on the floating solar photovoltaic system 100. Tidal forces ($F_{tidal}$) were calculated according to:

$$F_{tidal} = \frac{1}{2} \cdot \rho_w \cdot A_{tidal} \cdot v^2_{tidal}$$

where $\rho_w$ represents density of seawater, $A_{tidal}$ denotes area affected by tidal force in square meters, and $v_{tidal}$ indicates velocity of tidal movement in meters per second.

Current forces ($F_{current}$) were determined through:

$$F_{current} = \frac{1}{2} \cdot \rho_w \cdot A_{current} \cdot v^2_{current}$$

where $A_{current}$ represents cross-sectional area exposed to the current in square meters, and $v_{current}$ denotes velocity of the current in meters per second.

Wind forces ($F_{wind}$) acting on exposed surfaces were calculated using:

$$F_{wind} = 0.5 \cdot \rho_{air} \cdot A_{wind} \cdot v^2_{wind} \cdot C_d$$

where $\rho_{air}$ represents density of air (1.225 kg/m³ at sea level), $A_{wind}$ denotes area of the floating solar photovoltaic system 100 exposed to wind in square meters, $v_{wind}$ indicates wind velocity in meters per second, and Ca represents the drag coefficient (approximately 1.0 for flat surfaces).

Structural stability analysis of the anchoring system 104 evaluated rotational forces through calculation of stability moments ($M_{stability}$):

$$M_{stability} = W_{block} \cdot d_{block}$$

where $W_{block}$ represents weight of the concrete block in Newtons, and $d_{block}$ denotes distance from the center of mass to the base in meters. The stability moment calculations confirmed that rotational stability exceeded the combined moments generated by tidal, current, and wind forces acting on the floating solar photovoltaic system 100.

Detailed temperature monitoring during the evaluation period demonstrated distinct thermal management advantages of the floating solar photovoltaic system 100. Temperature measurements recorded between February 27th, 1200 hours and March 1st, 0530 hours revealed that the back-surface temperature of the bi-facial solar photovoltaic panel 130 in the floating configuration consistently maintained lower values compared to the ground-based installation. The temperature differential between front and back surfaces exhibited greater magnitude in the floating configuration, indicating enhanced heat dissipation through water-proximity effects.

The monitoring data demonstrated that peak temperature values at the back surface of the bi-facial solar photovoltaic panel 130 were consistently lower in the floating solar photovoltaic system 100 compared to the ground-based installation during daylight hours. Temperature uniformity characteristics also showed improvement, with reduced thermal gradient variations across the panel surface in the floating configuration. This thermal regulation effect was consistently observed across multiple measurement periods throughout the evaluation phase.

Long-term deployment evaluation confirmed sustained positional stability of the floating solar photovoltaic system 100 over a five-month operational period. The anchoring system 104 maintained the initial installation position despite exposure to varying environmental conditions including: tidal variations between 0.1 meters and 1.6 meters, wave action characteristic of coastal marine environments, water currents with velocities corresponding to local coastal patterns, and wind forces with measured velocities between 3.7 m/s and 5.4 m/s. The concrete blocks C, D, E positioned on the water body floor and concrete blocks A, B, F located on the shore maintained secure anchoring through the U-shaped steel hooks 142. The interconnected configuration of plastic-coated stainless-steel wires 140*a*-140*i* demonstrated effective force distribution characteristics under varying environmental loads.

Further, the floating solar photovoltaic system 100 demonstrated sustained structural integrity over the five-month deployment period. The marine-grade polyurethane wood sealant applied to the rectangular float 110 and cross-shaped support 126 maintained protective characteristics throughout the evaluation period. The zinc-rich primer and two-part epoxy paint coating system applied to metallic components, including the first triangular brace 132, second triangular brace 134, and control panel cabinet 136, exhibited continued corrosion resistance under marine environmental exposure.

The integrated monitoring systems maintained continuous operation throughout the deployment period, enabling comprehensive evaluation of system performance parameters. The data logger 158 collected synchronized measurements from the temperature sensors 150, 152, 154 monitoring thermal conditions, the solar irradiance sensor 156 measuring incident radiation, and the voltage sensor 168 and the current sensor 166 monitoring electrical parameters. The maximum power point tracking converter within the battery charger 172 demonstrated effective implementation of temperature-based control protocols, initiating protective deactivation when temperature measurements from the temperature sensor 152 on the bottom surface 130*b* exceeded measurements from the temperature sensor 150 on the top surface 130*a*.

Comparative analysis of thermal management characteristics between the floating solar photovoltaic system 100 and the ground-based installation confirmed reduced peak temperature values at the back surface of the bi-facial solar photovoltaic panel 130, enhanced temperature uniformity across panel surfaces, improved thermal regulation through water-proximity cooling effects, and sustained performance benefits through reduced thermal stress. The temperature regulation characteristics demonstrated by the floating solar photovoltaic system 100 indicated potential for enhanced operational efficiency through mitigation of temperature-induced performance degradation. The comprehensive monitoring data validated the effectiveness of the integrated cooling mechanisms in maintaining optimal operating temperatures for photovoltaic power generation.

The floating solar photovoltaic system 100 integrates multiple technical advancements through precise geometric configurations, strategic material selection, and comprehensive environmental monitoring capabilities. The implementation of the cross-shaped support 126 configured to hold plastic drums as the pontoons 128 enables stable deployment in marine environments while incorporating recycled materials. The bi-facial solar photovoltaic panel 130 mounted at a specific five-degree angle through the triangular braces 132, 134 facilitates enhanced power generation through capture of both direct and reflected radiation, while the proximity to water surfaces provides natural thermal regulation. The floating solar photovoltaic system 100 demonstrated measurable performance improvements through integrated cooling mechanisms, with temperature monitoring data confirming reduced back surface temperatures compared to ground-based installations. The anchoring system 104 incorporating the concrete blocks A-F connected through the plastic-coated stainless-steel wires 140*a*-140*i* maintained positional stability under tidal variations ranging from 0.1 to 1.6 meters and wind speeds between 3.7 and 5.4 m/s. The monitoring infrastructure comprising the temperature sensors 150, 152, 154 and the solar irradiance sensor 156 enabled automated system control through the maximum power point tracking converter, implementing protective measures based on real-time temperature differential measurements. The implementation of the data logger 158 with wireless transmission capabilities to the central database 160 enabled continuous performance monitoring and automated response to environmental variations. The dual-mode operation capability through the battery charger 172 provided both energy storage and power transmission functionality through controlled DC current management during charge and discharge sessions.

A first embodiment describes a floating solar photovoltaic system 100, comprising: a rectangular float 110 having a divided top platform 112 and a first wall 114, a second wall 116 opposite the first wall 114, a third wall 118 connected to a first end of the first wall 114 and to a first end of the second wall 116, and a fourth wall 120 opposite the third wall 118; a cross-shaped support 126 configured to fit between the four walls 114, 116, 118, 120 of the rectangular float 110; a set of four pontoons 128, wherein the cross-shaped support 126 is configured to hold each one of the four pontoons 128 within openings formed by the cross-shape of the cross-shaped support 126; a bi-facial solar photovoltaic panel 130 configured to generate electrical power from solar radiation; a control panel cabinet 136 connected to the cross-shaped support 126; a first triangular brace 132 connected to a first side 122 of the divided top platform 112; and a second triangular brace 134 connected to a second side 124 of the divided top platform 112, wherein each triangular brace 132, 134 is equipped with mounting hardware configured to secure the bi-facial solar photovoltaic panel 130 upon the respective triangular brace 132, 134.

In an aspect, the floating solar photovoltaic system 100, further comprises: an anchoring system 104 including: a plurality of concrete blocks A-F; a plurality of plastic-coated stainless-steel wires 140a-140i connected to the plurality of concrete blocks A-F and the walls 114, 116, 118, 120 of the rectangular float 110, wherein: a first plastic-coated stainless-steel wire 140a is connected between a first concrete block A and a center of the first wall 114; a second plastic-coated stainless-steel wire 140b is connected between a second concrete block B and a center of the second wall 116; a third plastic-coated stainless-steel wire 140c is connected between a third concrete block C and a first corner of the rectangular float 110, wherein the first corner is located at an intersection of the first wall 114 and the third wall 118; a fourth plastic-coated stainless-steel wire 140d is connected between a fourth concrete block D and a center of the third wall 118; a fifth plastic-coated stainless-steel wire 140e is connected between a fifth concrete block E and a second corner of the rectangular float 110, wherein the second corner is located at an intersection of the third wall 118 and the second wall 116; a sixth plastic-coated stainless-steel wire 140f is connected between the third concrete block C and the fourth concrete block D; a seventh plastic-coated stainless-steel wire 140g is connected between the fourth concrete block D and the fifth concrete block E; an eighth plastic-coated stainless-steel wire 140h is connected between the third concrete block C and a sixth concrete block F; and a ninth plastic-coated stainless-steel wire 140i is connected between the fifth concrete block E and the sixth concrete block F.

In an aspect, each of the plurality of concrete blocks A-F has a cubical dimension of about 381 mm$^3$ and a weight of about 144 kg.

In an aspect, the first concrete block A, the second concrete block B and the sixth concrete block F are located on a shore abutting a body of water supporting the floating solar photovoltaic system 100, and the third concrete block C, the fourth concrete block D and the fifth concrete block E are located on a floor of the body of water.

In an aspect, each of the plurality of concrete blocks A-F has a bottom side including six U-shaped steel hooks 142 configured to anchor the concrete block into one of the shore and the floor of the body of water.

In an aspect, each of the six U-shaped steel hooks 142 has a length of about 203 mm.

In an aspect, the pontoons 128 are plastic drums.

In an aspect, a hypotenuse of each triangular brace 132, 134 makes an angle of about five degrees with a base of the triangular brace 132, 134.

In an aspect, the rectangular float 110 and the cross-shaped support 126 are coated with marine-grade polyurethane wood sealant.

In an aspect, a plurality of stainless-steel screws are configured to connect the walls 114, 116, 118, 120, divided top platform 112 and cross-shaped support 126 together; each triangular brace 132, 134 is made of stainless-steel; and the mounting hardware comprises stainless-steel bolts, stainless-steel nuts and rubber washers.

In an aspect, each triangular brace 132, 134, the stainless-steel bolts, the stainless-steel nuts, the stainless-steel screws and the control panel cabinet 136 has a rust coating comprising a zinc-rich primer having a thickness in a range of about fifty microns to about seventy-five microns, wherein the zinc-rich primer contains zinc dust suspended in an epoxy binder, wherein the zinc dust contains zinc in an amount of 80 wt. % of the zinc dust.

In an aspect, each triangular brace 132, 134, the stainless-steel bolts, the stainless-steel nuts, the stainless-steel screws and the control panel cabinet 136 are further coated with a two-part epoxy paint over the rust coating, wherein the two-part epoxy paint has a thickness in a range of about seventy-five microns to about one hundred microns.

In an aspect, the floating solar photovoltaic system 100 further comprises a plurality of sensors including: at least one temperature sensor 150 located on a top side 130a of the bi-facial solar photovoltaic panel 130, at least one temperature sensor 152 located on a bottom side 130b of the bi-facial solar photovoltaic panel 130, at least one temperature sensor 154 attached below the rectangular float 110, and a solar irradiance sensor 156 located on a top side 130a of the bi-facial solar photovoltaic panel 130; and a data logger 158 located within the control panel cabinet 136 and operatively connected to each of the plurality of sensors 150, 152, 154, 156, wherein the data logger 158 is configured to collect sensor measurements at predetermined time intervals, time stamp the sensor measurements and wirelessly transmit the timestamped sensor measurements to a central database 160 configured to store the timestamped sensor measurements.

In an aspect, the floating solar photovoltaic system 100 further comprises: an inverter 162 located within the control panel cabinet 136; a junction box 164 connected to the bi-facial solar photovoltaic panel 130, wherein the junction box 164 is operatively connected to the inverter 162, wherein the inverter 162 is configured to transform an analog electrical current generated by the bi-facial solar photovoltaic panel 130 to a DC current; a current sensor 166 operatively connected to the inverter 162; and a voltage sensor 168 operatively connected to the inverter 162, wherein the current sensor 166 and the voltage sensor 168 are configured to transmit current measurements and voltage measurements respectively to the data logger 158, wherein the data logger 158 is configured to timestamp the current measurements and the voltage measurements, and wirelessly transmit the timestamped current measurements and the timestamped voltage measurements to the central database 160 configured to store the timestamped current measurements and the timestamped voltage measurements.

In an aspect, the floating solar photovoltaic system 100 further comprises: at least one rechargeable battery 170 located within the control panel cabinet 136; a battery charger 172 operatively connected to the rechargeable battery 170; wherein the inverter 162 is configured to transmit the DC current to the battery charger 172, wherein the battery charger 172 is configured to recharge the rechargeable battery 170 with the DC current.

In an aspect, the floating solar photovoltaic system 100 further comprises: an underwater cable 174 connected to the battery charger 172, wherein the battery charger 172 is a maximum power point tracking converter configured to charge the at least one rechargeable battery 170 with the DC current during a charge session and transmit the DC current over the underwater cable 174 to a shore based electric power station during a discharge session.

In an aspect, the maximum power point tracking converter is configured to monitor the sensor measurements and turn OFF the bi-facial solar photovoltaic panel 130 when the temperature measurement of at least one temperature sensor 152 located on the bottom side 130b of the bi-facial solar photovoltaic panel 130 is greater than the temperature measurement of at least one temperature sensor 150 located on the top side 130a of the bi-facial solar photovoltaic panel 130.

A second embodiment describes a method 600 for cooling a back surface of a photovoltaic panel, comprising: constructing the rectangular float 110 having the divided top platform 112 and the first wall 114, the second wall 116 opposite the first wall 114, the third wall 118 connected to a first end of the first wall 114 and to a first end of the second wall 116, and the fourth wall 120 opposite the third wall 118; constructing the cross-shaped support 126 and fitting the cross-shaped support 126 between the four walls 114, 116, 118, 120 of the rectangular float 110; placing the set of four plastic drums formed by the cross-shape of the cross-shaped support 126; connecting the first triangular brace 132 to the first side 122 of the divided top platform 112; connecting the second triangular brace 134 to the second side 124 of the divided top platform 112; connecting the bi-facial solar photovoltaic panel 130 configured to generate electrical power from solar radiation to the first triangular brace 132 and the second triangular brace 134; connecting the control panel cabinet 136 to the cross-shaped support 126; operatively connecting the bi-facial solar photovoltaic panel 130 to the inverter 162 located in the control panel cabinet 136; floating the rectangular float 110 in a body of water; generating, by the bi-facial solar photovoltaic panel 130, an analog electrical current; transforming, by the inverter 162, the analog electrical current to a DC current; operatively connecting at least one temperature sensor 150 to the top side 130a of the bi-facial solar photovoltaic panel 130, at least one temperature sensor 152 to the bottom side 130b of the bi-facial solar photovoltaic panel 130, at least one temperature sensor 154 below the rectangular float 110, and the solar irradiance sensor 156 to the top side 130a of the bi-facial solar photovoltaic panel 130; generating, by the temperature sensors 150, 152, 154 and the solar irradiance sensor 156, sensor measurements; operatively connecting each temperature sensor 150, 152, 154 and the solar irradiance sensor 156 to the data logger 158 located within the control panel cabinet 136; operatively connecting the voltage sensor 168 and the current sensor 166 to the inverter 162; generating, by the voltage sensor 168 and the current sensor 166, voltage measurements and current measurements respectively; transmitting, by the inverter 162, the voltage measurements and current measurements to the data logger 158; collecting, by the data logger 158, the sensor measurements, the voltage measurements and the current measurements at predetermined time intervals; timestamping, by the data logger 158, the sensor measurements, the voltage measurements and the current measurements; wirelessly transmitting, by the data logger 158, the timestamped sensor measurements, the timestamped voltage measurements and the timestamped current measurements to the central database 160; storing the timestamped sensor measurements in the central database 160; operatively connecting the battery charger 172 to the at least one rechargeable battery 170 located within the control panel cabinet 136; and transmitting, by the inverter 162, the DC current to the battery charger 172, wherein the battery charger 172 is configured to charge the at least one rechargeable battery 170 with the DC current during a charge session and transmit the DC current over the underwater cable 174 to a shore based electric power station during a discharge session.

In an aspect, the method 600 further comprises: anchoring, by a first plurality of concrete blocks C, D, E each equipped with the six U-shaped steel hooks 142 and attached to one of the first set of plastic-coated stainless-steel wires 140c, 140d, 140e, the rectangular float 110 to a floor of the body of water; connecting, by a second set of plastic-coated steel wires 140f, 140g, each of the first plurality of concrete blocks C, D, E in a string; anchoring, by a second plurality of concrete blocks A, B, F each equipped with the six U-shaped steel hooks 142 and attached to one of the third set of plastic-coated stainless-steel wires 140a, 140b, the rectangular float 110 to a shore abutting the body of water; and connecting, by a fourth set of plastic-coated steel wires 140h, 140i, the first plurality of concrete blocks C, E to one of the second plurality of concrete blocks F located on the shore.

Figure 7:
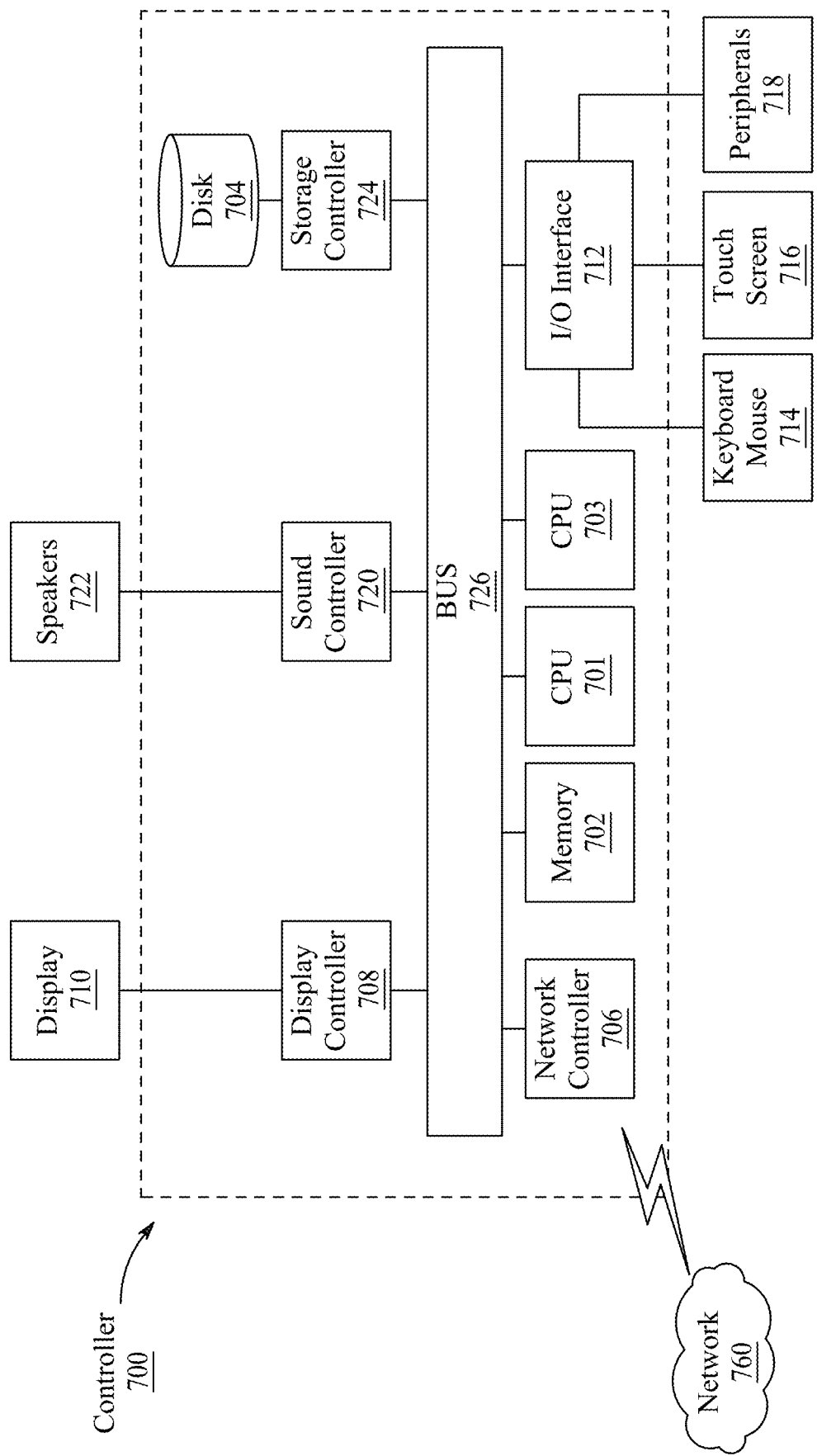
FIG. 7 is an illustration of a non-limiting example of details of computing hardware used in the computing system, according to certain embodiments.

Next, further details of the hardware description of a computing environment according to exemplary embodiments is described with reference to FIG. 7. In FIG. 7, a controller 700 is described is representative of the data logger 158 of the floating solar photovoltaic system 100, in which the controller 700 is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general-purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
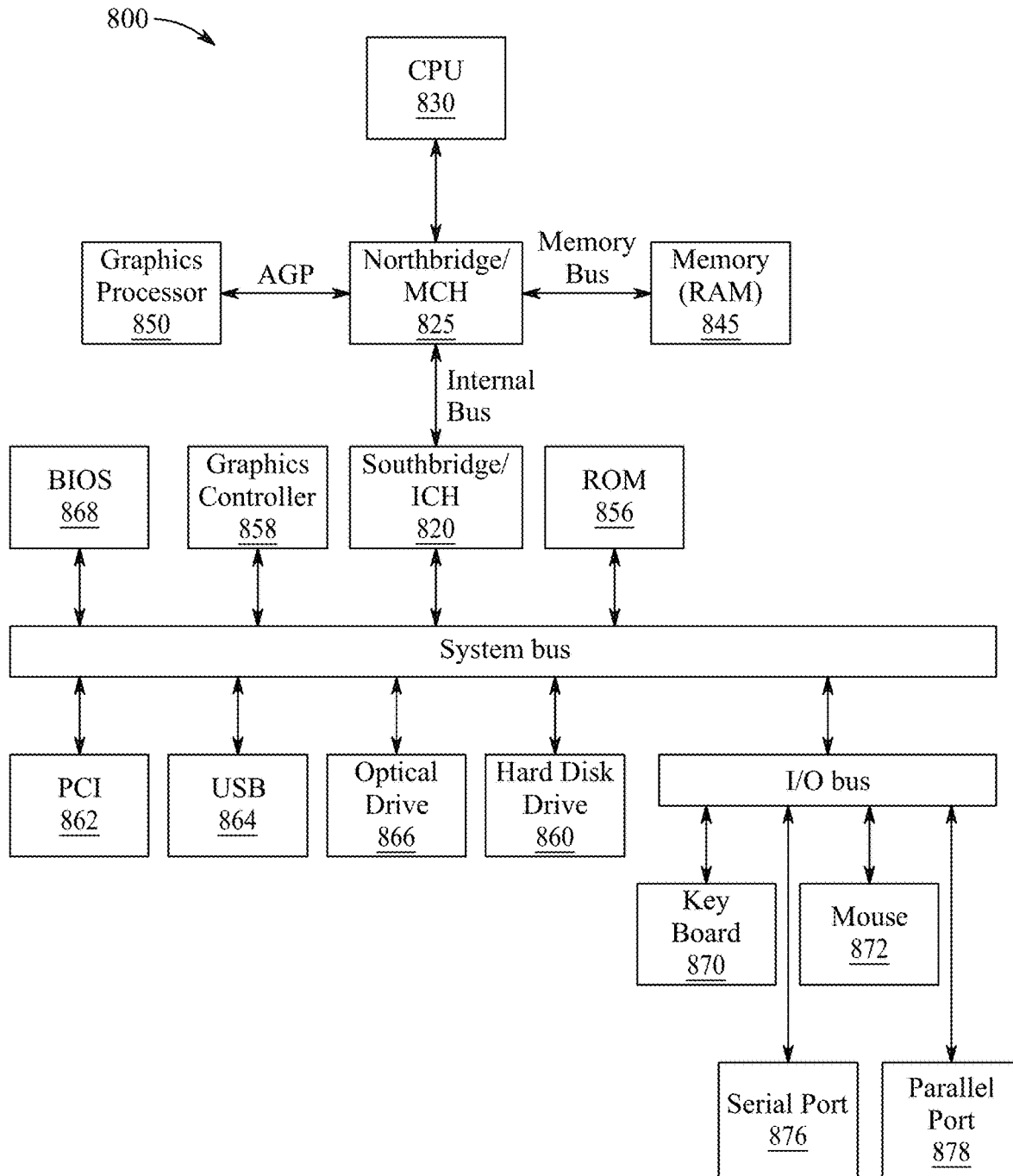
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
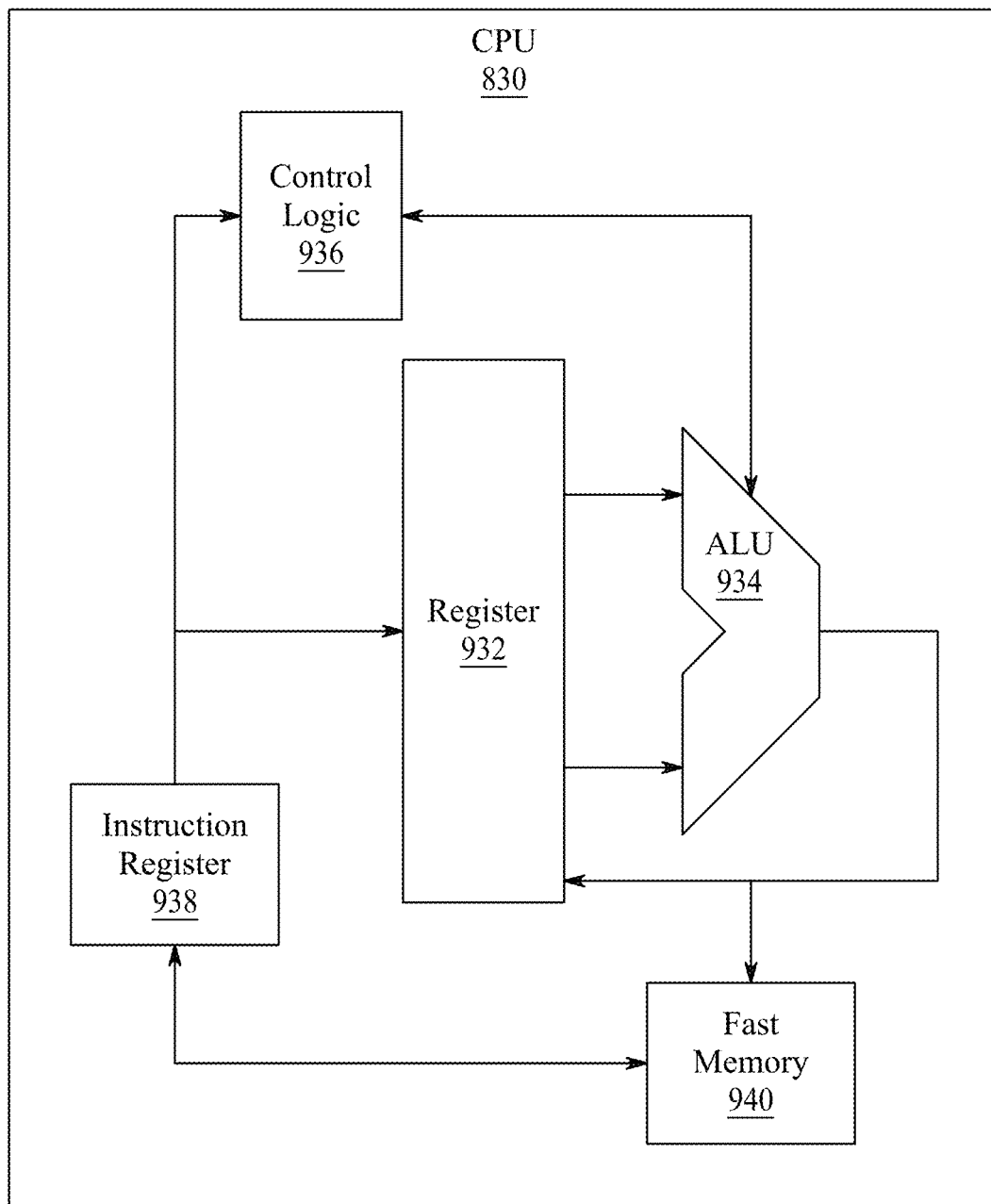
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
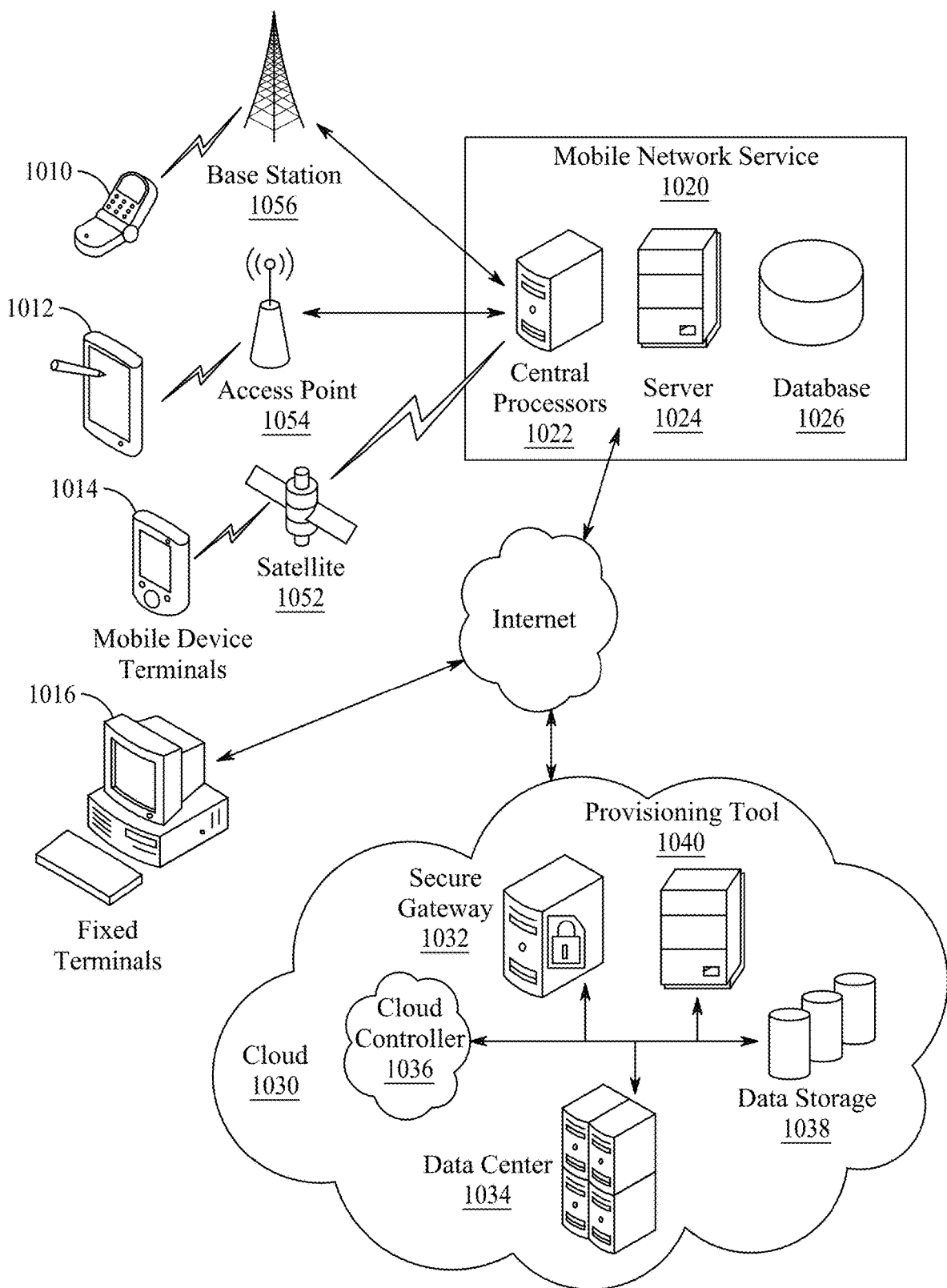
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1030 including a cloud controller 1036, a secure gateway 1032, a data center 1034, data storage 1038 and a provisioning tool 1040, and mobile network services 1020 including central processors 1022, a server 1024 and a database 1026, which may share processing, as shown by FIG. 10, in addition to various human interface and communication devices (e.g., display monitors 1016, smart phones 1010, tablets 1012, personal digital assistants (PDAs) 1014). The network may be a private network, such as a LAN, satellite 1052 or WAN 1054, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. For example, different cellular automata rules or encryption algorithms could be employed, or alternative feature extraction and face recognition techniques could be integrated into the system.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A pontoon platform supported solar photovoltaic system, comprising:
    a rectangular float having a divided top platform and a first wall, a second wall opposite the first wall, a third wall connected to a first end of the first wall and to a first end of the second wall, and a fourth wall opposite the third wall;
    a cross-shaped support configured to fit between the four walls of the rectangular float;
    a set of four pontoons, wherein the cross-shaped support is configured to hold each one of the four pontoons within openings formed by the cross-shape of the cross-shaped support, said pontoons distributed symmetrically in the openings;
    a bi-facial solar photovoltaic panel configured to generate electrical power from solar radiation;
    a control panel cabinet connected to the cross-shaped support;
    a first triangular brace connected to a first side of the divided top platform; and
    a second triangular brace connected to a second side of the divided top platform, wherein each triangular brace is equipped with mounting hardware configured to secure the bi-facial solar photovoltaic panel upon the respective triangular brace.

2. The pontoon platform supported solar photovoltaic system of claim 1, further comprising:
    an anchoring system including:
        a plurality of concrete blocks;
        a plurality of plastic-coated stainless-steel wires connected to the plurality of concrete blocks and the walls of the rectangular float, wherein:
            a first plastic-coated stainless-steel wire is connected between a first concrete block A and a center of the first wall;
            a second plastic-coated stainless-steel wire is connected between a second concrete block B and a center of the second wall;
            a third plastic-coated stainless-steel wire is connected between a third concrete block C and a first corner of the rectangular float, wherein the first corner is located at an intersection of the first wall and the third wall;
            a fourth plastic-coated stainless-steel wire is connected between a fourth concrete block D and a center of the third wall;
            a fifth plastic-coated stainless-steel wire is connected between a fourth concrete block E and a second corner of the rectangular float, wherein the second corner is located at an intersection of the third wall and the second wall;
            a sixth plastic-coated stainless-steel wire is connected between the third concrete block C and the fourth concrete block D;
            a seventh plastic-coated stainless-steel wire is connected between the fourth concrete block D and the fifth concrete block E;
            an eighth plastic-coated stainless-steel wire is connected between the third concrete block C and a sixth concrete block F; and
            a ninth plastic-coated stainless-steel wire is connected between the fifth concrete block E and the sixth concrete block F.

3. The pontoon platform supported solar photovoltaic system of claim 2, wherein each of the plurality of concrete blocks has a cubical dimension of about 381 $mm^3$ and a weight of about 144 kg.

4. The pontoon platform supported solar photovoltaic system of claim 2, wherein:
    the first concrete block A, the second concrete block B and the sixth concrete block F are located on a shore abutting a body of water supporting the pontoon platform supported solar photovoltaic system, and
    the third concrete block C, the fourth concrete block D and the fifth concrete block E are located on a floor of the body of water.

5. The pontoon platform supported solar photovoltaic system of claim 4, wherein each of the plurality of concrete blocks has a bottom side including six U-shaped steel hooks configured to anchor the concrete block into one of the shore and the floor of the body of water.

6. The pontoon platform supported solar photovoltaic system of claim 5, wherein each of the six U-shaped steel hooks has a length of about 203 mm.

7. The pontoon platform supported solar photovoltaic system of claim 1, wherein the pontoons are plastic drums.

8. The pontoon platform supported solar photovoltaic system of claim 1, wherein a hypotenuse of each triangular brace makes an angle of about five degrees with a base of the triangular brace.

9. The pontoon platform supported solar photovoltaic system of claim 1, wherein the rectangular float and the cross-shaped support are coated with marine-grade polyurethane wood sealant.

10. The pontoon platform supported solar photovoltaic system of claim 1, wherein:
    a plurality of stainless-steel screws is configured to connect the walls, divided top platform and cross-shaped support together;
    each triangular brace is made of stainless-steel; and
    the mounting hardware comprises stainless-steel bolts, stainless-steel nuts and rubber washers.

11. The pontoon platform supported solar photovoltaic system of claim 10, wherein each triangular brace, the stainless-steel bolts, the stainless-steel nuts, the stainless-steel screw and the control panel cabinet has a rust coating comprising a zinc-rich primer having a thickness in a range of about fifty microns to about seventy-five microns, wherein the zinc-rich primer contains zinc dust suspended in an epoxy binder, wherein the zinc dust contains zinc in an amount of 80 wt. % of the zinc dust.

12. The pontoon platform supported solar photovoltaic system of claim 11, wherein each triangular brace, the stainless-steel bolts, the stainless-steel nuts, the stainless-steel screw and the control panel cabinet are further coated with a two-part epoxy paint over the rust coating, wherein the two-part epoxy paint has a thickness in a range of about seventy-five microns to about one hundred microns.

13. The pontoon platform supported solar photovoltaic system of claim 1, further comprising:
   a plurality of sensors including:
      at least one temperature sensor located on a top side of the bi-facial solar photovoltaic panel,
      at least one temperature sensor located on a bottom side of the bi-facial solar photovoltaic panel,
      at least one temperature sensor attached below the rectangular float, and
      a solar irradiance sensor located on a top side of the bi-facial solar photovoltaic panel; and
   a data logger located within the control panel cabinet and operatively connected to each of the plurality of sensors, wherein the data logger is configured to collect sensor measurements at predetermined time intervals, time stamp the sensor measurements and wirelessly transmit the timestamped sensor measurements to a central database configured to store the timestamped sensor measurements.

14. The pontoon platform supported solar photovoltaic system of claim 13, further comprising:
   an inverter located within the control panel cabinet;
   a junction box connected to the bi-facial solar photovoltaic panel, wherein the junction box is operatively connected to the inverter, wherein the inverter is configured to transform an analog electrical current generated by the bi-facial solar photovoltaic panel to a DC current;
   a current sensor operatively connected to the inverter; and
   a voltage sensor operatively connected to the inverter, wherein the current sensor and the voltage sensor are configured to transmit current measurements and voltage measurements respectively to the data logger, wherein the data logger is configured to timestamp the current measurements and the voltage measurements, and wirelessly transmit the timestamped current measurements and the timestamped voltage measurements to the central database configured to store the timestamped current measurements and the timestamped voltage measurements.

15. The pontoon platform supported solar photovoltaic system of claim 14, further comprising:
   at least one rechargeable battery located within the control panel cabinet;
   a battery charger operatively connected to the rechargeable battery;
   wherein the inverter is configured to transmit the DC current to the battery charger, wherein the battery charger is configured to recharge the rechargeable battery with the DC current.

16. The pontoon platform supported solar photovoltaic system of claim 15, further comprising:
   an underwater cable connected to the battery charger, wherein the battery charger is a maximum power point tracking converter configured to charge the at least one rechargeable battery with the DC current during a charge session and transmit the DC current over the underwater cable to a shore based electric power station during a discharge session.

17. The pontoon platform supported solar photovoltaic system of claim 16, wherein the maximum power point tracking converter is configured to monitor the sensor measurements and turn OFF the bi-facial solar photovoltaic panel when the temperature measurement of at least one temperature sensor located on the bottom side of the bi-facial solar photovoltaic panel is greater than the temperature measurement of at least one temperature sensor located on the top side of the bi-facial solar photovoltaic panel.

\* \* \* \* \*